US012785856B2

(12) United States Patent
Yang et al.

(10) Patent No.: US 12,785,856 B2
(45) Date of Patent: Nov. 3, 2026

(54) HYBRID AUTOMATIC REPEAT REQUEST DESIGN

(71) Applicant: QUALCOMM Incorporated, San Diego, CA (US)

(72) Inventors: Wei Yang, San Diego, CA (US); Jing Sun, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 434 days.

(21) Appl. No.: 18/438,210

(22) Filed: Feb. 9, 2024

(65) Prior Publication Data

US 2025/0260514 A1 Aug. 14, 2025

(51) Int. Cl.

| | |
|---|---|
| ***H04W 4/00*** | (2018.01) |
| ***H04L 1/08*** | (2006.01) |
| ***H04L 1/1812*** | (2023.01) |
| ***H04L 5/00*** | (2006.01) |

(52) U.S. Cl.

CPC .............. *H04L 1/08* (2013.01); *H04L 1/1812* (2013.01); *H04L 5/0053* (2013.01)

(58) Field of Classification Search

CPC ........ H04L 1/08; H04L 1/1812; H04L 5/0053

USPC .......................................................... 370/329

See application file for complete search history.

(56) References Cited

U.S. PATENT DOCUMENTS

| | | | | |
|---|---|---|---|---|
| 2013/0114748 A1* | 5/2013 | Kubota | H04L 1/188 375/259 |
| 2014/0208179 A1* | 7/2014 | Burhan | H04L 1/1883 714/748 |
| 2020/0044788 A1* | 2/2020 | Meyer | H04L 1/1812 |
| 2020/0052824 A1* | 2/2020 | Bienas | H04L 1/1812 |

* cited by examiner

*Primary Examiner* — Temica M Beamer

(74) *Attorney, Agent, or Firm* — Holland & Hart LLP

(57) ABSTRACT

Methods, systems, and devices for wireless communications are described. Techniques described herein provide HARQ design. In some examples, a user equipment (UE) may receive from a network entity, a transport block. The UE may transmit, to the network entity, one or more feedback messages that indicate that a reception of the transport block was unsuccessful and indicate a request for a time delay associated with a retransmission of the transport block. The UE may receive, from the network entity, the retransmission of the transport block. In some cases, the time delay may be a delayed timeline for a transmission of an acknowledgment feedback or a negative acknowledgment feedback associated with a reception of the retransmission of first transport block. In some examples, the time delay may be an extended transmission duration for the retransmission of the transport block.

30 Claims, 19 Drawing Sheets

HYBRID AUTOMATIC REPEAT REQUEST DESIGN

FIELD OF TECHNOLOGY

The following relates to wireless communications, including hybrid automatic repeat request design.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support hybrid automatic repeat request (HARQ) design. For example, the described techniques provide for a HARQ procedure retransmission tapering. In some examples, a user equipment (UE) may receive, from a network entity, a transport block. The UE may transmit, to the network entity, one or more feedback messages that indicate that a reception of the transport block was unsuccessful and that indicate a request for a time delay associated with a retransmission of the transport block. In some examples, the time delay may be a delayed timeline for a transmission of an acknowledgment (ACK) feedback or a negative acknowledgment (NACK) feedback associated with a reception of the retransmission. In some cases, the time delay may be an extended transmission duration for the retransmission of the transport block.

A method for wireless communication by a user equipment (UE) is described. The method may include receiving, from a network entity, a first transport block, transmitting, to the network entity based on receiving the first transport block, one or more feedback messages that indicate that a reception of at least a portion of the first transport block was unsuccessful and indicate a request for a time delay associated with a retransmission of the first transport block, and receiving, from the network entity based on transmitting the one or more feedback messages, the retransmission of the first transport block.

A user equipment (UE) for wireless communication is described. The user equipment (UE) may include one or more memories storing processor executable code, and one or more processors coupled with the one or more memories. The one or more processors may individually or collectively be operable to execute the code to cause the user equipment (UE) to receive, from a network entity, a first transport block, transmit, to the network entity based on receiving the first transport block, one or more feedback messages that indicate that a reception of at least a portion of the first transport block was unsuccessful and indicate a request for a time delay associated with a retransmission of the first transport block, and receive, from the network entity based on transmitting the one or more feedback messages, the retransmission of the first transport block.

Another user equipment (UE) for wireless communication is described. The user equipment (UE) may include means for receiving, from a network entity, a first transport block, means for transmitting, to the network entity based on receiving the first transport block, one or more feedback messages that indicate that a reception of at least a portion of the first transport block was unsuccessful and indicate a request for a time delay associated with a retransmission of the first transport block, and means for receiving, from the network entity based on transmitting the one or more feedback messages, the retransmission of the first transport block.

A non-transitory computer-readable medium storing code for wireless communication is described. The code may include instructions executable by one or more processors to receive, from a network entity, a first transport block, transmit, to the network entity based on receiving the first transport block, one or more feedback messages that indicate that a reception of at least a portion of the first transport block was unsuccessful and indicate a request for a time delay associated with a retransmission of the first transport block, and receive, from the network entity based on transmitting the one or more feedback messages, the retransmission of the first transport block.

In some examples of the method, user equipment (UEs), and non-transitory computer-readable medium described herein, the time delay includes a delayed timeline for a transmission of a first ACK feedback or a first NACK feedback associated with a reception of the retransmission of the first transport block.

Some examples of the method, user equipment (UEs), and non-transitory computer-readable medium described herein may further include operations, features, means, or instructions for receiving, from the network entity after transmitting the one or more feedback messages, a second transport block and transmitting, to the network entity based on receiving the second transport block, a second ACK feedback or a second NACK feedback associated with a reception of the second transport block, where the transmission of the second ACK feedback or the second NACK feedback occurs prior to the transmission of the first ACK feedback or the first NACK feedback.

In some examples of the method, user equipment (UEs), and non-transitory computer-readable medium described herein, the time delay includes an extended transmission duration for the retransmission of the first transport block.

Some examples of the method, user equipment (UEs), and non-transitory computer-readable medium described herein may further include operations, features, means, or instructions for receiving, from the network entity based on transmitting the one or more feedback messages, a second transport block, where the retransmission of the first transport block may be frequency-division multiplexed with the second transport block.

Some examples of the method, user equipment (UEs), and non-transitory computer-readable medium described herein may further include operations, features, means, or instructions for receiving, from the network entity, a second transport block on a second component carrier, where the first transport block may be received on a first component carrier.

In some examples of the method, user equipment (UEs), and non-transitory computer-readable medium described herein, transmitting the one or more feedback messages may include operations, features, means, or instructions for transmitting, to the network entity based on receiving the first transport block and the second transport block, one or more joint feedback messages associated with both the first transport block and the second transport block, where the one or more joint feedback messages indicate that the reception of at least the portion of the first transport block was unsuccessful and that a reception of at least the portion of the second transport block was unsuccessful and indicate the request for the time delay.

Some examples of the method, user equipment (UEs), and non-transitory computer-readable medium described herein may further include operations, features, means, or instructions for receiving, from the network entity based on a reception of at least a portion of the second transport block was unsuccessful, a retransmission of the second transport block, where the retransmission of the second transport block may be received after the retransmission of the first transport block.

In some examples of the method, user equipment (UEs), and non-transitory computer-readable medium described herein, transmitting the one or more feedback messages may include operations, features, means, or instructions for transmitting a NACK feedback message that indicates that the reception of at least the portion of the first transport block was unsuccessful and transmitting a message that indicates the request for the time delay associated with the retransmission of the first transport block.

In some examples of the method, user equipment (UEs), and non-transitory computer-readable medium described herein, transmitting the one or more feedback messages may include operations, features, means, or instructions for transmitting a NACK feedback message that indicates that the reception of at least the portion of the first transport block was unsuccessful and that indicates the request for the time delay associated with the retransmission of the first transport block.

A method for wireless communication by a user equipment (UE) is described. The method may include receiving, from a network entity, a first transport block, transmitting, to the network entity based on receiving the first transport block, one or more feedback messages that indicate that a reception of at least a portion of the first transport block was unsuccessful and indicate a request for a delayed scheduling of a retransmission of the first transport block, and receive, from the network entity based on transmitting the one or more feedback messages, the retransmission of the first transport block.

A user equipment (UE) for wireless communication is described. The user equipment (UE) may include one or more memories storing processor executable code, and one or more processors coupled with the one or more memories. The one or more processors may individually or collectively be operable to execute the code to cause the user equipment (UE) to receive, from a network entity, a first transport block, transmit, to the network entity based on receiving the first transport block, one or more feedback messages that indicate that a reception of at least a portion of the first transport block was unsuccessful and indicate a request for a delayed scheduling of a retransmission of the first transport block, and receive, from the network entity based on transmitting the one or more feedback messages, the retransmission of the first transport block.

Another user equipment (UE) for wireless communication is described. The user equipment (UE) may include means for receiving, from a network entity, a first transport block, means for transmitting, to the network entity based on receiving the first transport block, one or more feedback messages that indicate that a reception of at least a portion of the first transport block was unsuccessful and indicate a request for a delayed scheduling of a retransmission of the first transport block, and means for receive, from the network entity based on transmitting the one or more feedback messages, the retransmission of the first transport block.

A non-transitory computer-readable medium storing code for wireless communication is described. The code may include instructions executable by one or more processors to receive, from a network entity, a first transport block, transmit, to the network entity based on receiving the first transport block, one or more feedback messages that indicate that a reception of at least a portion of the first transport block was unsuccessful and indicate a request for a delayed scheduling of a retransmission of the first transport block, and receive, from the network entity based on transmitting the one or more feedback messages, the retransmission of the first transport block.

Some examples of the method, user equipment (UEs), and non-transitory computer-readable medium described herein may further include operations, features, means, or instructions for receiving, from the network entity, a second transport block on a second component carrier, where the first transport block may be received on a first component carrier.

In some examples of the method, user equipment (UEs), and non-transitory computer-readable medium described herein, transmitting the one or more feedback messages may include operations, features, means, or instructions for transmitting, to the network entity based on receiving the first transport block and receiving the second transport block, one or more joint feedback messages associated with both the first transport block and the second transport block, where the one or more joint feedback messages indicate that the reception of at least the portion of the first transport block and indicate that a reception of at least the portion of the second transport block was unsuccessful and indicate the request for the delayed scheduling.

In some examples of the method, user equipment (UEs), and non-transitory computer-readable medium described herein, transmitting the one or more feedback messages may include operations, features, means, or instructions for transmitting a NACK feedback message that indicates that the reception of at least the portion of the first transport block was unsuccessful and transmitting a request message that indicates the request for the delayed scheduling.

In some examples of the method, user equipment (UEs), and non-transitory computer-readable medium described herein, transmitting the one or more feedback messages may include operations, features, means, or instructions for transmitting a NACK feedback message that indicates that the reception of at least the portion of the first transport block was unsuccessful and that indicates the request for the delayed scheduling.

A method for wireless communication by a network entity is described. The method may include outputting, to a user equipment (UE), a first transport block, obtaining, from the UE based on outputting the first transport block, one or more feedback messages that indicate that a reception of at least a portion of the first transport block was unsuccessful and indicate a request for a time delay associated with a retransmission of the first transport block, and outputting, to the UE based on obtaining the one or more feedback messages, the retransmission of the first transport block.

A network entity for wireless communication is described. The network entity may include one or more memories storing processor executable code, and one or more processors coupled with the one or more memories. The one or more processors may individually or collectively be operable to execute the code to cause the network entity to output, to a UE, a first transport block, obtain, from the UE based on outputting the first transport block, one or more feedback messages that indicate that a reception of at least a portion of the first transport block was unsuccessful and indicate a request for a time delay associated with a retransmission of the first transport block, and output, to the UE based on obtaining the one or more feedback messages, the retransmission of the first transport block.

Another network entity for wireless communication is described. The network entity may include means for outputting, to a UE, a first transport block, means for obtaining, from the UE based on outputting the first transport block, one or more feedback messages that indicate that a reception of at least a portion of the first transport block was unsuccessful and indicate a request for a time delay associated with a retransmission of the first transport block, and means for outputting, to the UE based on obtaining the one or more feedback messages, the retransmission of the first transport block.

A non-transitory computer-readable medium storing code for wireless communication is described. The code may include instructions executable by one or more processors to output, to a UE, a first transport block, obtain, from the UE based on outputting the first transport block, one or more feedback messages that indicate that a reception of at least a portion of the first transport block was unsuccessful and indicate a request for a time delay associated with a retransmission of the first transport block, and output, to the UE based on obtaining the one or more feedback messages, the retransmission of the first transport block.

In some examples of the method, network entities, and non-transitory computer-readable medium described herein, the time delay includes a delayed timeline for obtaining a first ACK feedback or a first NACK feedback associated with the retransmission of the first transport block.

Some examples of the method, network entities, and non-transitory computer-readable medium described herein may further include operations, features, means, or instructions for outputting, to the UE based on obtaining the one or more feedback messages, a second transport block and obtaining, from the UE based on outputting the second transport block, a second ACK feedback or a second NACK feedback associated with the second transport block, where the obtaining of the second ACK feedback or the second NACK feedback occurs prior to the obtaining of the first ACK feedback or the first NACK feedback.

In some examples of the method, network entities, and non-transitory computer-readable medium described herein, the time delay includes an extended transmission duration for the retransmission of the first transport block.

Some examples of the method, network entities, and non-transitory computer-readable medium described herein may further include operations, features, means, or instructions for outputting, to the UE based on obtaining the one or more feedback messages, a second transport block and the retransmission of the first transport block, where the retransmission of the first transport block may be frequency-division multiplexed with the second transport block.

Some examples of the method, network entities, and non-transitory computer-readable medium described herein may further include operations, features, means, or instructions for outputting, to the UE, a second transport block on a second component carrier, where the first transport block may be outputted on a first component carrier.

In some examples of the method, network entities, and non-transitory computer-readable medium described herein, obtaining the one or more feedback messages may include operations, features, means, or instructions for obtaining, from the UE based on outputting the first transport block and outputting the second transport block, one or more joint feedback messages associated with both the first transport block and the second transport block, where the one or more joint feedback messages indicate that the reception of at least the portion of the first transport block and a reception of at least the portion of the second transport block was unsuccessful and indicate the request for the time delay.

Some examples of the method, network entities, and non-transitory computer-readable medium described herein may further include operations, features, means, or instructions for obtaining, from the UE based on outputting the first transport block and outputting the second transport block, one or more second feedback messages associated with the second transport block, where the one or more second feedback messages indicate that a reception of at least the portion of the second transport block was unsuccessful and outputting, to the UE based on the reception of the one or more second feedback messages, a retransmission of the second transport block, where the retransmission of the second transport block may be outputted after the retransmission of the first transport block.

In some examples of the method, network entities, and non-transitory computer-readable medium described herein, obtaining the one or more feedback messages may include operations, features, means, or instructions for obtaining a NACK feedback message that indicates that the reception of at least the portion of the first transport block was unsuccessful and obtaining a request message that indicates the request for the time delay associated with the retransmission of the first transport block.

In some examples of the method, network entities, and non-transitory computer-readable medium described herein, obtaining the one or more feedback messages may include operations, features, means, or instructions for obtaining a NACK feedback message that indicates that the reception of at least the portion of the first transport block was unsuccessful and that indicates the request for the time delay associated with the retransmission of the first transport block.

A method for wireless communication by a network entity is described. The method may include outputting, to a UE, a first transport block, obtaining, from the UE based on outputting the first transport block, one or more feedback messages that indicate that a reception of at least a portion of the first transport block was unsuccessful and indicate a request for a delayed scheduling of a retransmission of the first transport block, and outputting, to the UE based on obtaining the one or more feedback messages, the retransmission of the first transport block.

A network entity for wireless communication is described. The network entity may include one or more memories storing processor executable code, and one or more processors coupled with the one or more memories. The one or more processors may individually or collectively be operable to execute the code to cause the network entity to output, to a UE, a first transport block, obtain, from the UE based on outputting the first transport block, one or more feedback messages that indicate that a reception of at least a portion of the first transport block was unsuccessful and indicate a request for a delayed scheduling of a retransmission of the first transport block, and output, to the UE based on obtaining the one or more feedback messages, the retransmission of the first transport block.

Another network entity for wireless communication is described. The network entity may include means for outputting, to a UE, a first transport block, means for obtaining, from the UE based on outputting the first transport block, one or more feedback messages that indicate that a reception of at least a portion of the first transport block was unsuccessful and indicate a request for a delayed scheduling of a retransmission of the first transport block, and means for outputting, to the UE based on obtaining the one or more feedback messages, the retransmission of the first transport block.

A non-transitory computer-readable medium storing code for wireless communication is described. The code may include instructions executable by one or more processors to output, to a UE, a first transport block, obtain, from the UE based on outputting the first transport block, one or more feedback messages that indicate that a reception of at least a portion of the first transport block was unsuccessful and indicate a request for a delayed scheduling of a retransmission of the first transport block, and output, to the UE based on obtaining the one or more feedback messages, the retransmission of the first transport block.

Some examples of the method, network entities, and non-transitory computer-readable medium described herein may further include operations, features, means, or instructions for outputting, to the UE, a second transport block on a second component carrier, where the first transport block may be outputted on a first component carrier.

In some examples of the method, network entities, and non-transitory computer-readable medium described herein, obtaining the one or more feedback messages may include operations, features, means, or instructions for obtaining, from the UE based on outputting the first transport block and outputting the second transport block, one or more joint feedback messages associated with both the first transport block and the second transport block, where the one or more joint feedback messages indicate that the reception of at least the portion of the first transport block and a reception of at least the portion of the second transport block was unsuccessful and indicate the request for the delayed scheduling.

In some examples of the method, network entities, and non-transitory computer-readable medium described herein, obtaining the one or more feedback messages may include operations, features, means, or instructions for obtaining a NACK feedback message that indicates that the reception of at least the portion of the first transport block was unsuccessful and obtaining a request message that indicates the request for the delayed scheduling.

In some examples of the method, network entities, and non-transitory computer-readable medium described herein, obtaining the one or more feedback messages may include operations, features, means, or instructions for obtaining a NACK feedback message that indicates that the reception of at least the portion of the first transport block was unsuccessful and that indicates the request for the delayed scheduling.

DETAILED DESCRIPTION

Figure 1:
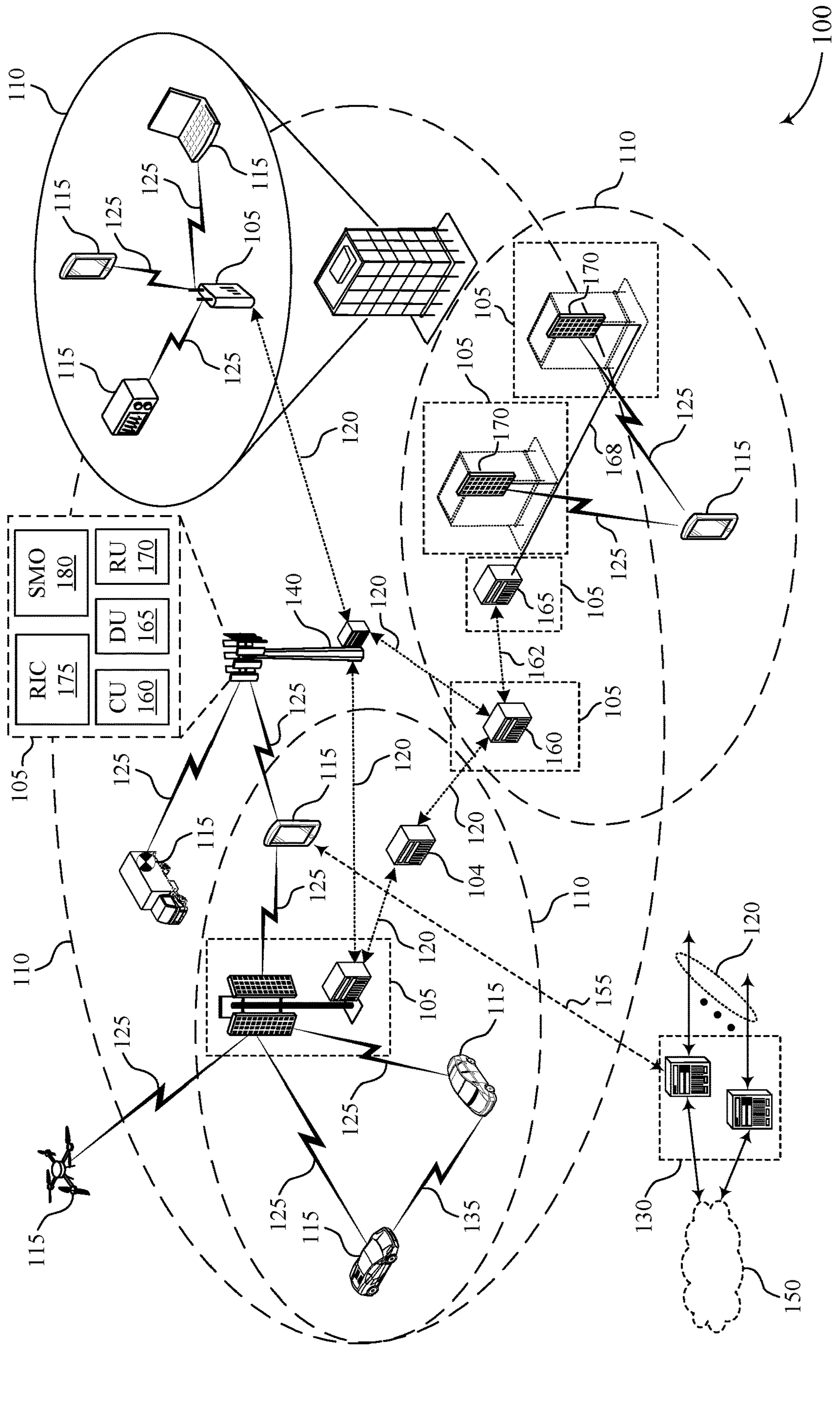
FIG. 1 shows an example of a wireless communications system that supports hybrid automatic repeat request (HARQ) design in accordance with one or more aspects of the present disclosure.

In some wireless communications systems, a user equipment (UE) may communicate with a network entity. In some examples, signaling from the network entity may be encoded, and the UE may perform a decoding operation to process data transmitted by the network entity. In some examples, the UE may implement an incremental redundancy (IR) hybrid automatic repeat request (HARQ) procedure to mitigate decoding errors during the decoding operations. For example, the UE may write or offload log-likelihood ratios (LLRs) associated with the IR-HARQ process to a memory (e.g., a low-power double data rate (LPDDR) synchronous dynamic random-access memory (SRAM)) of the UE. As a part of the IR-HARQ procedure, the network entity may retransmit the encoded signaling if the UE fails to decode the initial encoded signaling, and the UE may read or onload the LLRs from the memory associated with the retransmitted encoded signaling. As a part of the decoding operation, the UE may write bits (e.g., offload) to the memory of the UE, the UE may read bits (e.g., onload)

from the memory of the UE, or both onload and offload bits (e.g., information bits) to/from the memory of the UE. However, the bandwidth of the memory may limit an ability of the UE to write data to or read data from the memory.

Techniques for HARQ design may provide an efficient usage of the memory bandwidth. A UE may receive, from a network entity, a first transport block. The UE may transmit, to the network entity, one or more feedback messages that indicate that a reception of a portion of the first transport block was unsuccessful and that indicate a request for a time delay associated with a retransmission of the first transport block. In some examples, the time delay may be a delayed timeline for a transmission of a first acknowledgment (ACK) feedback or a first negative acknowledgment (NACK) feedback associated with a reception of the retransmission, among other examples. The delayed timeline for the ACK feedback or NACK feedback may support tapering of the LLR onload associated with the retransmission by spreading the LLR onload over a longer duration. In some cases, the time delay may be an extended transmission duration for the retransmission of the first transport block. The extended transmission duration may support tapering of the LLR onload associated with the retransmission by spreading the LLR onload over a longer duration. In some examples, the UE may receive, from the network entity, the retransmission of the first transport block and a second transport block. In some cases, the retransmission of the first transport block may be frequency-division multiplexed with the second transport block. In some cases, the UE may transmit, to the network entity based on receiving the second transport block, a second ACK feedback or a second NACK feedback (among other examples) associated with a reception of the second transport block, and a second ACK feedback or a second NACK feedback may be transmitted prior to the transmission of the first ACK feedback or a first NACK feedback associated with the retransmission of the first transport block.

In some examples, the UE may receive, from a network entity, a first transport block. The UE may transmit, to the network entity, one or more feedback messages that indicate that a reception of a portion of the first transport block was unsuccessful and that indicate a request for a delayed scheduling of a retransmission of the first transport block. In some examples, the delayed scheduling of the retransmission may support tapering of the LLR offload associated with the first transport block by spreading the LLR offload over a longer duration. In some examples, the UE may receive, from the network entity, the retransmission of the first transport block and a second transport block. In some cases, the UE may receive the retransmission of the first transport block on a first component carrier and the second transport block on a second component carrier. The UE may transmit, to the network entity, one or more joint feedback messages associated with the first transport block and the second transport block.

Aspects of the disclosure are initially described in the context of wireless communications systems. Aspects of the disclosure are also described in context of timing diagrams and process flows. Aspects of the disclosure are further illustrated by and described with reference to apparatus diagrams, system diagrams, and flowcharts that relate to HARQ design.

FIG. 1 shows an example of a wireless communications system 100 that supports HARQ design in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support HARQ design as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHZ.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. HARQ feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communications systems, the UE 115 may communicate with the network entity 105. In some examples, signaling from the network entity 105 may be encoded, and the UE 115 may perform a decoding operation to receive data transmitted by the network entity 105. The UE 115 may implement an IR HARQ procedure to mitigate decoding errors during the decoding operations. For example, the UE 115 may write or offload LLRs associated with the IR-HARQ process to a memory (e.g., a LPDDR SRAM) of the UE 115. Additionally, as a part of the IR-HARQ procedure, the network entity 105 may retransmit the encoded signaling if the UE 115 fails to decode the initial encoded signaling, and the UE 115 may read or onload the LLRs from the memory associated with a retransmission. Additionally, as a part of the decoding operation, the UE 115 may write bits (e.g., offload) to the memory of the UE 115, the UE 115 may read bits (e.g., onload) from the memory of the UE 115 or both onload and offload bits (e.g., information bits) to the memory of the UE 115. However, the bandwidth of the memory may limit an ability of the UE 115 to write data to or read data from the memory.

Techniques for HARQ design may provide an efficient usage of the memory bandwidth. The UE 115 may receive, from the network entity 105, a first transport block. The UE 115 may transmit, to the network entity 105, one or more feedback messages that indicate that a reception of a portion of the first transport block was unsuccessful and that indicate a request for a time delay associated with a retransmission of the first transport block. In some examples, the time delay may be a delayed timeline for a transmission of a first ACK feedback or a first NACK feedback associated with a reception of the retransmission. The delayed timeline for the ACK feedback or NACK feedback may support tapering of the LLR onload associated with the retransmission by spreading the LLR onload over a longer duration. In some cases, the time delay may be an extended transmission duration for the retransmission of the first transport block. The extended transmission duration may support tapering of the LLR onload associated with the retransmission by spreading the LLR onload over a longer duration. In some examples, the UE 115 may receive, from the network entity 105, the retransmission of the first transport block and a second transport block. In some cases, the retransmission of the first transport block may be frequency-division multiplexed with the second transport block. In some cases, the UE 115 may transmit, to the network entity 105 based on receiving the second transport block, a second ACK feedback or a second NACK feedback associated with a reception of the second transport block, and second ACK feedback or a second NACK feedback may be transmitted prior to the transmission of the first ACK feedback or a first NACK feedback associated with the retransmission of the first transport block.

In some examples, the UE 115 may receive, from a network entity 105, a first transport block. The UE 115 may transmit, to the network entity 105, one or more feedback messages that indicate that a reception of a portion of the first transport block was unsuccessful and that indicate a request for a delayed scheduling of a retransmission of the first transport block. In some examples, the delayed scheduling of the retransmission may support tapering of the LLR offload associated with the first transport block by spreading the LLR offload over a longer duration. In some examples, the UE 115 may receive, from the network entity 105, the retransmission of the first transport block and a second transport block. In some cases, the UE 115 may receive the retransmission of the first transport block on a first component carrier and the second transport block on a second component carrier. The UE 115 may transmit, to the network entity 105, one or more joint feedback messages associated with both the first transport block and the second transport block.

Figure 2:
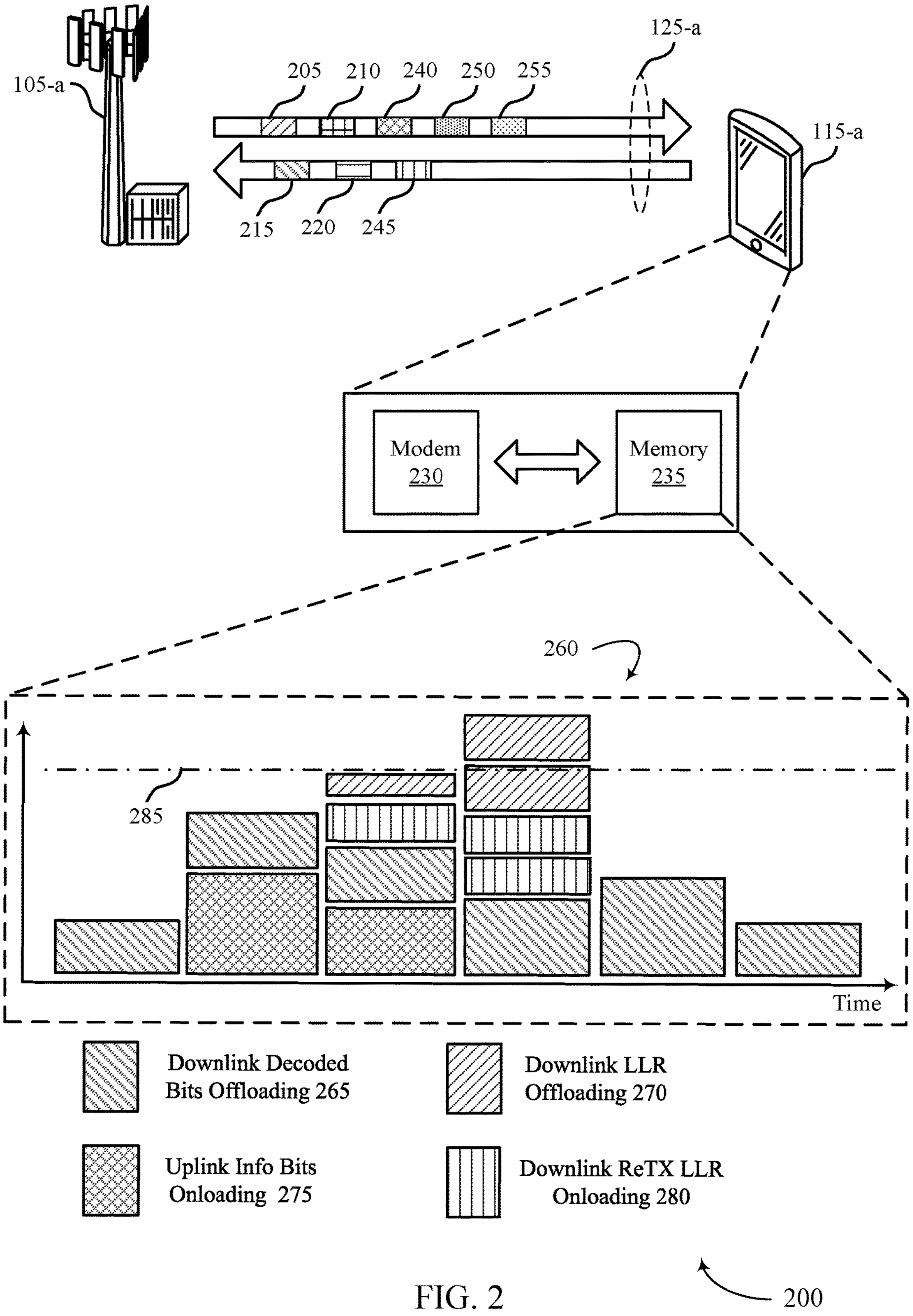
FIG. 2 shows an example of a wireless communications system that supports HARQ design in accordance with one or more aspects of the present disclosure.

FIG. 2 shows an example of a wireless communications system 200 that supports HARQ design in accordance with one or more aspects of the present disclosure. The wireless communications system 200 may implement aspects of or may be implemented by aspects of the wireless communications system 100. For example, the wireless communications system 200 includes a UE 115-*a*, which may be an example of a UE 115 as described herein. The wireless communications system 200 may also include a network entity 105-*a*, which may be an example of a network entity 105 as described herein.

The UE 115-*a* may communicate with the network entity 105-*a* using a communication link 125-*a*. The communication link 125-*a* may be an example of an NR or LTE link (among other examples) between the UE 115-*a* and the network entity 105-*a*. The communication link 125-*a* may include bi-directional links that enable both uplink and downlink communications. For example, the network entity 105-*a* may transmit downlink signals (e.g., downlink transmissions), such as downlink control signaling 205 and downlink data signals 210, to the UE 115-*a* using the communication link 125-*a*, and the UE 115-*a* may transmit uplink signals (e.g., uplink transmissions), such as uplink control signaling 215 and uplink data signals 220, to the network entity 105-*a* using the communication link 125-*a*.

In some examples, the UE 115-*a* may include a modem 230 and a memory 235. The memory 235 may be a random-access memory (RAM), such as a LPDDR SRAM. In some examples, the network entity 105-*a* may transmit, to the UE 115-*a*, a transport block 240 including one or more bits carrying data (e.g., information bits). The transport block 240 may be encoded, and the UE 115-*a* may decode the transport block 240 (e.g., encoded bits) to receive signaling from the network entity 105-*a*. The UE 115-*a* may perform a decoding operation to receive the data of the transport block 240 transmitted by the network entity 105-*a*. In some cases, the UE 115-*a* may transmit, to the network entity 105-*a*, a feedback message 245 that indicates that a reception of a portion of the transport block 240 was unsuccessful. For example, the UE 115-*a* may have failed to successfully decoded the transport block 240. The network entity 105-*a* may transmit, to the UE 115-*a*, a retransmission 250 of the transport block.

In some examples, the UE 115-*a*, the network entity 105-*a*, or both may support IR-HARQ procedures. In some cases, IR-HARQ procedures may improve system robustness, coverage, and spectral efficiency. For example, the UE 115-*a*, the network entity 105-*a*, or both may implement IR-HARQ procedures to reduce decoding errors, a total quantity of retransmissions, or both during the decoding operations. As a part of an IR-HARQ procedure, the UE 115-*a* may write or offload information to the memory 235, and the information may be related to the transport block 240 that the UE 115-*a* failed to successfully decode. The information may include one or more LLRs for the transport block 240 which the UE 115-*a* may use in a soft combining procedure. As a part of the soft combining procedure, the UE 115-*a* may offload LLRs for the transport block 240 that was unsuccessfully received.

During soft combining, to successfully decode the retransmission 250, the UE 115-*a* may read (e.g., onload) LLRs associated with previous instances of the transport block 240 from the memory 235. The UE 115-*a* may use the LLRs to detect errors in the retransmission 250 and successfully decode the retransmission 250. Additionally, or alternatively, the UE 115-*a* may perform other operations that may access the memory 235, including reading or onloading information bits from the memory 235 or writing or offloading information bits to the memory 235. The UE 115-*a* may perform onloading and offloading of bits in accordance with a bandwidth of the memory 235. The bandwidth of the memory 235 may limit the ability of the UE 115-*a* to write data to or read data from the memory 235 and may become a bottleneck for the IR-HARQ process.

FIG. 2 shows an example of a memory usage diagram 260 for the memory 235. In some examples, the horizontal axis of the memory usage diagram 260 may represent a time component of memory operations performed by the UE 115-*a*, and the vertical axis of the memory usage diagram 260 may represent a DDR bandwidth access activity at the memory 235 of the UE 115-*a*. For HARQ operation, the memory 235 may be accessed for different types (e.g., four types) of onloading and offloading operations: downlink decoded information bits offloading 265, downlink LLR offloading 270, uplink information bits onloading 275, and downlink retransmission LLR onloading 280 (among other examples). The downlink decoded information bits offloading 265 and the uplink information bits onloading 275 may not be delayed otherwise the uplink or downlink data rate may not be sustained. The downlink LLR offloading 270 and downlink retransmission LLR onloading 280 may be tapered down to postpone or slow down the DDR access when reaching the DDR bandwidth limit at cost of extra delay. In some examples, the memory usage diagram 260 includes a DDR bandwidth limit 285. For the example shown in FIG. 2, the downlink retransmission LLR onloading 280 or the downlink LLR offloading 270 may be tapered to avoid exceeding the DDR bandwidth limit 285. Techniques for HARQ design may provide an efficient usage of the memory bandwidth, among other advantages. Network entity and UE control signaling design as described herein may support dynamic or smart DDR bandwidth management and sustain throughput, among other advantages.

Figure 3:
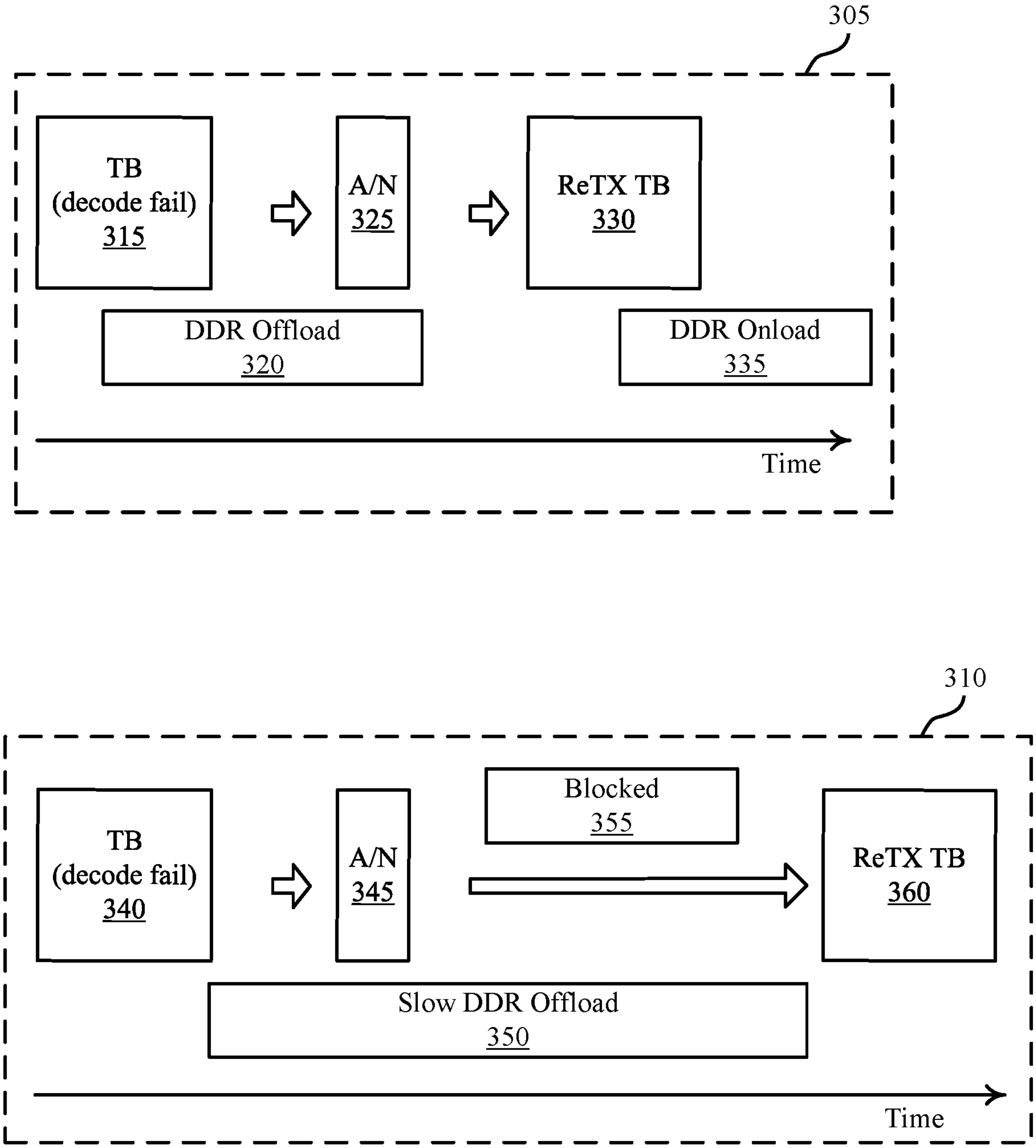
FIG. 3 shows an example of a timing diagram that supports HARQ design in accordance with one or more aspects of the present disclosure.

FIG. 3 shows an example of a timing diagram 300 that supports HARQ design in accordance with one or more aspects of the present disclosure. Aspects of the timing diagram 300 may implement, or be implemented by, aspects of wireless communications system 100 and the wireless communications system 200, or any combination thereof.

In some examples, the HARQ design may be a delayed scheduling of a retransmission or a tapering of the retransmission to lower the activity density of the downlink decoded bits offloading to the memory 235. In some cases, the UE 115-*a* may transmit signaling to the network entity to support LLR offload tapering. For example, when a large transport block fails decoding, a large quantity of LLRs may be offloaded to the memory 235 by the UE 115-*a*. The UE 115-*a* may stretch the offloading of the LLRs over multiple slots or over a duration. When tapering of the offloading of the LLRs, the retransmission of the transport block that failed decoding may occur after the offloading of the LLRs to the memory 235 is completed.

In some examples, the UE 115-*a* may indicate to the network entity 105-*a* a request for a delayed scheduling of the retransmission 250 of the transport block that failed decoding. For example, UE 115-*a* may transmit, to the network entity 105-*a* based on receiving the transport block 240, the feedback message 245 that indicates that a reception of at least a portion of the transport block 240 was unsuccessful and indicates a request for a delayed scheduling of a retransmission 250 of the transport block. In some cases, the request for the delayed scheduling may be together with the ACK or NACK feedback associated with the failed decoding of the transport block 240 or the request for the delayed scheduling may be in a separate feedback message. In some cases, the UE 115-*a* may request that the retransmission 250 occur after a quantity of slots of the transmission of the feedback message 245. The UE 115-*a* or the network entity may determine the delay associated with the delayed scheduling of the retransmission using various techniques, such as by implementing artificial intelligence (AI) and/or machine learning (ML) techniques.

The timing diagram 300 shows a timing diagram 305 without tapering and a timing diagram with tapering of the retransmission 310. For example, the timing diagram 305 without tapering shows the UE 115-*a* receiving the transport block 315 that fails decoding, the downlink LLR offloading 320 to the memory 235, and the UE 115-*a* transmitting the feedback message 325 that indicates that a reception of at least a portion of the transport block was unsuccessful. After the downlink decoded bits offloading 320 is complete, the UE 115-*a* may receive the retransmission 330 of the transport block and may perform the downlink retransmission LLRs onloading 335.

For the timing diagram with tapering of the retransmission 310, the UE 115-*a* may receive the transport block 340 that fails decoding, and UE 115-*a* may transmit the feedback message 345 that indicates that a reception of at least a portion of the transport block was unsuccessful and that indicates a request for a delayed scheduling of the retransmission of the transport block. In some cases, the indication of the request for the delayed scheduling of the retransmission of the transport block may be transmitted in a separate resource or separate feedback message from the ACK/NACK feedback. The downlink LLR offloading 350 to the memory 235 may be slowed or extended one or more additional slots, such as a set of slots, and the retransmission is blocked 355 for a duration during which the retransmission is not scheduled. After the blocked 355 duration or the delay, the UE 115-*a* may receive the retransmission of the transport block 360.

Figure 4:
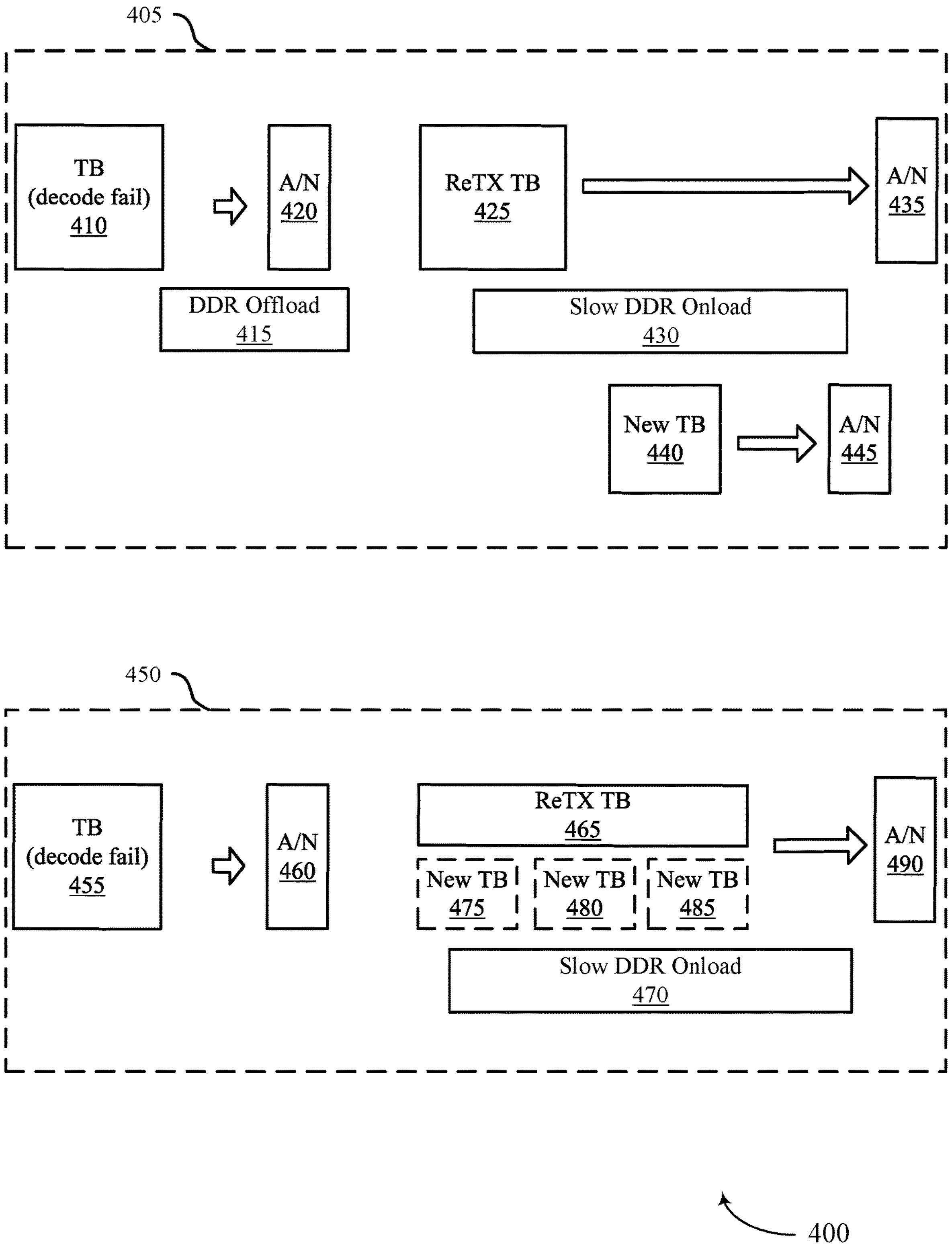
FIG. 4 shows an example of a timing diagram that supports HARQ design in accordance with one or more aspects of the present disclosure.

FIG. 4 shows an example of a timing diagram 400 that supports HARQ design in accordance with one or more aspects of the present disclosure. Aspects of the timing diagram 400 may implement, or be implemented by, aspects of wireless communications system 100 and the wireless communications system 200, or any combination thereof.

In some examples, the HARQ design may be a delayed timeline for a transmission of an ACK or NACK associated with a reception of the retransmission of the transport block to lower the activity density of the downlink retransmission LLR onloading from the memory 235. In some cases, the UE 115-*a* may transmit signaling to the network entity to support LLR onload tapering. For example, when a large transport block is retransmitted, a large quantity of LLRs may be onloaded from the memory 235 to the modem 230 by the UE 115-*a*. The UE 115-*a* may stretch the onloading of the LLRs over multiple slots or over a duration. When tapering of the onloading of the LLRs, the decoding timeline for the physical downlink shared channel PDSCH may be delayed.

In some examples, the UE 115-*a* may transmit, to the network entity 105-*a*, a request for a slower ACK/NACK timeline (e.g., a larger N1 value) for the retransmission 250 of the transport block that failed decoding. For example, UE 115-*a* may transmit, to the network entity 105-*a* based on receiving the transport block 240, the feedback message 245 that indicates that a reception of at least a portion of the transport block 240 was unsuccessful and indicates a request for a time delay associated with a retransmission 250 of the transport block 240. In some examples, the time delay may be a delayed timeline for a transmission of the ACK/NACK associated with a reception of the retransmission 250 of the transport block 240. In some cases, the request for the time delay may be together with the ACK or NACK feedback associated with the failed decoding of the transport block 240 or the request for the time delay in a separate feedback message. In some cases, the UE 115-*a* may request that the delayed timeline for a transmission of the ACK/NACK occur after a quantity of slots of the transmission of the feedback message 245. In some cases, the UE 115-*a* may request that the delayed timeline for a transmission of the ACK/NACK occur after a quantity of slots of the reception of the retransmission 250 of the transport block. The UE 115-*a* or the network entity 105-*a* may determine the delay associated with the ACK/NACK using various techniques, such as by implementing artificial intelligence (AI) and/or machine learning (ML) techniques.

In some examples, in order to not slow down overall communication throughput, out of order processing between the retransmission 250 and a new transport block 255 that does not use onloading may be allowed. An in order HARQ-ACK report may mean that the HARQ-ACK of an early transmitted transport block may be sent no later than the HARQ-ACK associated with a later transport block. An out of order HARQ-ACK report may allow the HARQ-ACK of the early transmitted transport block to be sent later than the HARQ-ACK associated with a later transport block.

The timing diagram 400 shows a timing diagram 405 with a delayed ACK/NACK timeline associated with the retransmission of the transport block. The UE 115-*a* may receive the transport block 410 that fails decoding, and UE 115-*a* may transmit the feedback message 420 that indicates that a reception of at least a portion of the transport block was unsuccessful and that indicates a request for a time delay (e.g., delayed timeline for a transmission of the ACK/NACK associated with a reception of the retransmission). The UE 115-*a* may perform downlink decoded bits offloading 415 to the memory 235. The UE 115-*a* may receive the retransmission 425 of the terminal block, and the downlink retransmission LLR onloading 430 from the memory 235 may be slowed or extended additional set of slots. After the delay, the UE 115-*a* may transmit the ACK/NACK 435 associated with the reception of the retransmission. The timing diagram 405 also illustrates the out of order processing between the retransmission 250 and a new transport block 255 that does not use LLR onloading. The UE 115-*a* may receive the new transport block 440 after the receiving the retransmission 425, and the UE may transmit a HARQ-ACK 445 for the new transport block prior to transmitting the ACK/NACK 435 (e.g., HARQ ACK) of the retransmission.

In some examples, the HARQ design may be an extended transmission duration for the retransmission of the transport block to lower the activity density of the downlink retransmission LLR onloading from the memory 235. The UE 115-*a* may transmit to the network entity 105-*a* a request for an extended transmission duration for the retransmission 250 of the transport block 240 that failed decoding. If a start and length indicator value (SLIV) (e.g., duration) for the retransmission is longer, the LLR onloading may be spread over a longer duration. For example, UE 115-*a* may transmit, to the network entity 105-*a* based on receiving the transport block 240, the feedback message 245 that indicates that a reception of at least a portion of the transport block 240 was unsuccessful and indicates a request for a time delay associated with a retransmission 250 of the transport block 240. In some examples, the time delay may be an extended transmission duration for the retransmission 250 of the transport block 240. In some cases, the UE 115-*a* may request the network entity 105-*a* to schedule the retransmission of the transport block with a longer SLIV. The retransmission may be scheduled with either the same bandwidth but lower modulation and coding scheme (MCS) or same MCS but smaller bandwidth or with a repetition in case the longer SLIV is not supported. The UE 115-*a* or the network entity 105-*a* may determine the extended transmission duration for the retransmission using various techniques, such as by implementing artificial intelligence (AI) and/or machine learning (ML) techniques.

To further improve the UE (e.g., UE 115-*a*) throughput, the network entity 105-*a* may frequency-division multiplex (FDM) the retransmission 250 of the failed transport block with a new transmission of another transport block which does not use LLR onloading to decode. For example, the decoding and demodulation may run at full speed, and the LLR onloading for the failed transport block may be spread over a greater quantity of slots. The FDM of the retransmission and the new transmission may not use out of order scheduling. The multiplexing of the retransmission transport block and the new transport block may occur in either the frequency domain or in the spatial domain (e.g., two layers for the retransmission and two layers for the new transport block.

The timing diagram 400 shows a timing diagram 450 with extended transmission duration for the retransmission of the transport block. The UE 115-*a* may receive the transport block 455 that fails decoding, and the UE 115-*a* may transmit the feedback message 460 that indicates that a reception of at least a portion of the transport block was unsuccessful and indicates a request for a time delay (e.g., extended transmission duration for the retransmission). After the transmitting the feedback message, the UE 115-*a* may receive the retransmission 465 of the transport block that has the extended transmission duration. The UE 115-*a* may slow the downlink retransmission LLR onloading 470 due to the extended duration of the retransmission 465. The UE 115-*a* may transmit the ACK/NACK 490. The timing diagram 450 also illustrates the FDM of the retransmission and transmission of new transport block 475, new transport block 480, and new transport block 485 with the UE 115-*a* receiving the new transport block 475, the new transport block 480, and the new transport block 485.

In some examples, the network entity 105-*a* and the UE 115-*a* may implement carrier aggregation, and the network entity 105-*a* may transmit, to the UE 115-*a*, one or more transport blocks across multiple component carriers. For example, the network entity 105-*a* may transmit, to the UE 115-*a*, a first transport block across a first component carrier, a second transport block across a second component carrier, and a third transport block across a third component carrier. In some cases, all three (in this example) of the transport blocks across the multiple component carriers may fail and the UE 115-*a* may use LLR offloading and LLR onloading for the first transport block, the second transport block, and the third transport block. At peak envelop which may be the situation for DDR bandwidth to reach the limit, the UE 115-*a* may support the multiple component carriers. The LLR onloading and LLR offloading of these multiple component carriers share the same DDR bandwidth, and the decoding status of different transport blocks may be different. In some examples, the UE 115-*a* and network entity 105-*a* may use the HARQ design with the tapering of the LLR onloading and LLR offloading for the multiple failed transport blocks.

In some examples, the indication of the LLR onloading or LLR offloading tapering request may be jointly signaled for the one or more transport blocks across multiple component carriers and/or slots. For example, when the UE 115-*a* has more than one transport block on respective component carriers that fail, the LLR onloading or offloading for all of the transport blocks may be tapered down. The UE 115-*a* may not send the tapering request to the network entity 105-*a* multiple times; rather, the UE 115-*a* may send one feedback message that indicates the retransmission of the multiple transport blocks be tapered down. For example, the UE 115-*a* may transmit one joint indication for all failed transport blocks across multiple component carriers or slots whose HARQ-ACK are multiplexed on the same HARQ-ACK feedback codebook or transmission. In another example, the UE 115-*a* may transmit one joint indication for all failed transport blocks that are scheduled in the same slot across different component carriers requesting a slower retransmission, so the indication may be per slot instead of per transport block. For example, the UE 115-*a* may receive, from the network entity, a first transport block on a first component carrier and a second transport block on a second component carrier. The UE 115-*a* may transmit, to the network entity 105-*a* based on receiving the first transport block and the second transport block, one or more joint feedback messages associated with both the first transport block and the second transport block. The one or more joint feedback messages may indicate that the reception of first transport block was unsuccessful and that a reception of the second transport block was unsuccessful and may indicate the request for the time delay. In some cases, the one or more joint feedback messages may indicate the request for the slower ACK/NACK timeline for the retransmission of the transport block that failed decoding.

Figure 5:
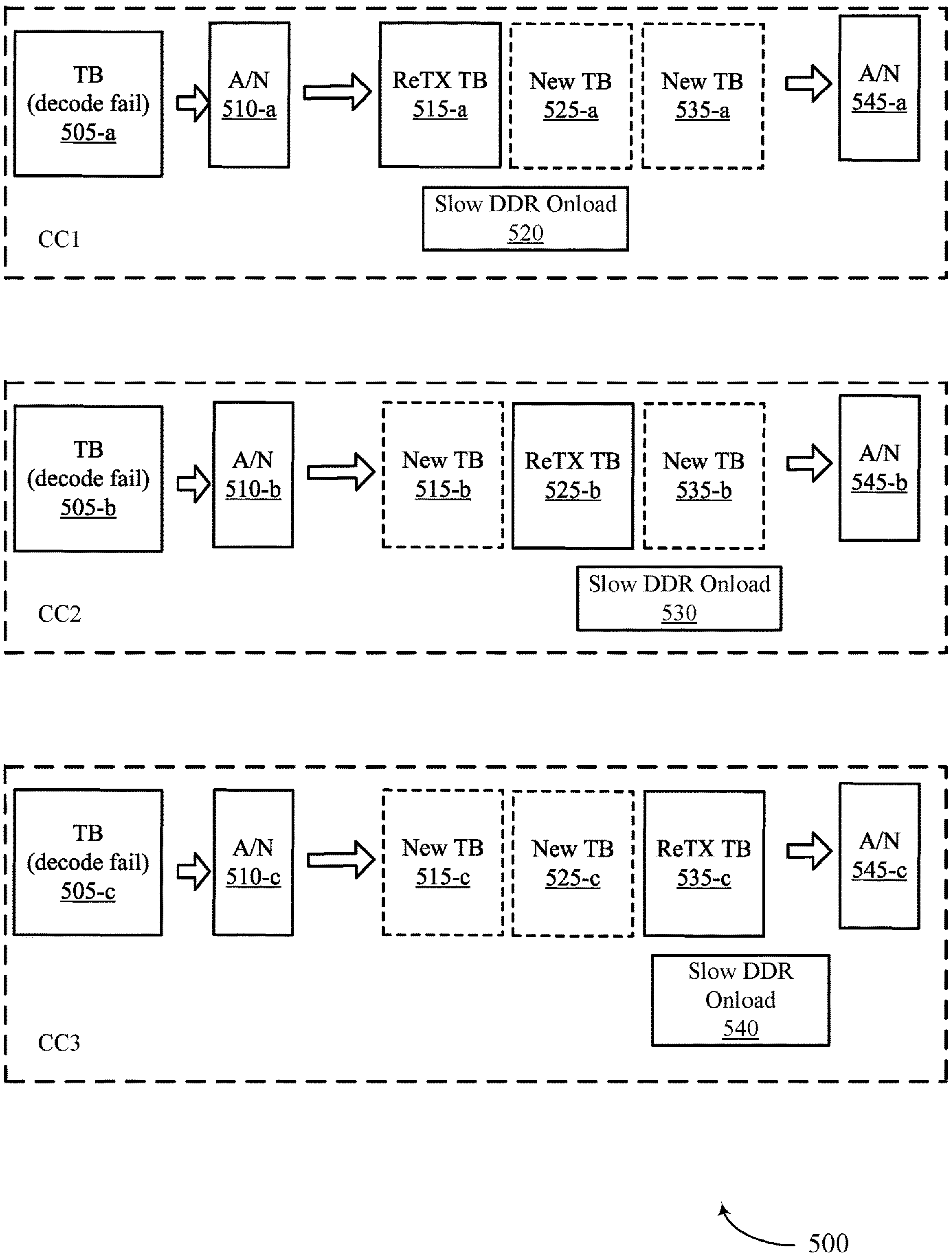
FIG. 5 shows an example of a timing diagram that supports HARQ design in accordance with one or more aspects of the present disclosure.

FIG. 5 shows an example of a timing diagram 500 that supports HARQ design in accordance with one or more aspects of the present disclosure. Aspects of the timing diagram 400 may implement, or be implemented by, aspects of wireless communications system 100 and the wireless communications system 200, or any combination thereof.

In some examples, the HARQ design may be a retransmission tapering or time delay with staggered retransmission for carrier aggregation. For the carrier aggregation case, if multiple transport blocks fail across different component carriers at the same time, the retransmission taper may occur in the following manner: one or a subset of the failed transport blocks may be retransmitted in a given slot, and the retransmissions of the multiple failed transport blocks may be spread across multiple slots in a staggered manner to provide tapering of the LLR onloading. In order for the retransmission delay to provide tapering of the LLR onloading, the UE 115-*a* may be provided the ordering of the staggered retransmissions of the transport blocks. In some examples, the network entity 105-*a* and the UE 115-*a* may agree that the retransmission of the failed transport blocks may follow a pre-defined order, such as based on a component carrier index. For example, the retransmission of the failed transport block associated with the first carrier component is transmitted first, the retransmission of the failed transport block associated with the second carrier component is transmitted second, and the retransmission of the failed transport block associated with the third carrier component is transmitted third.

The timing diagram 500 shows a staggered retransmission for carrier aggregation. The UE 115-*a* may receive a first transport block 505-*a* of a first component carrier that fails decoding, a second transport block 505-*b* of a second component carrier that fails decoding, and a third transport block 505-*c* of a third component carrier that fails decoding. The UE may transmit a feedback message 510-*a*, a feedback message 510-*b*, and a feedback message 510-*c* that indicate that a reception of at least a portion of the transport block was unsuccessful and indicate a request for a time delay (e.g., time delay with staggered retransmission for carrier aggregation). In some cases, the feedback message 510-*a*, the feedback message 510-*b*, and the feedback message 510-*c* may be jointly signaled in a single feedback message for the transport blocks across the multiple component carriers. After the transmitting the feedback message(s), the UE 115-*a* may receive the retransmission 515-*a* of the transport block of the first component carrier, a new transport block 515-*b* of the second component carrier, and a new transport block 515-*c* of the third component carrier. The UE 115-*a* may slow downlink retransmission LLR onloading 520 associated with the retransmission of the transport block of the first component. The UE 115-*a* may receive the retransmission 525-*b* of the transport block of the second component carrier, a new transport block 525-*a* of the first component carrier, and a new transport block 525-*c* of the third component carrier. The UE 115-*a* may slow downlink retransmission LLR onloading 530 associated with the retransmission of the transport block of the second component carrier. The UE 115 a may receive the retransmission 535-*c* of the transport block of the third component carrier, a new transport block 535-*a* of the first component carrier, and a new transport block 535-*b* of the second component carrier. The UE 115-*a* may slow downlink retransmission LLR onloading 540 associated with the retransmission of the transport block of the third component carrier. The UE may transmit an ACK/NACK 545-*a*, an ACK/NACK 545-*b* and an ACK/NACK 545-*c*.

Figure 6:
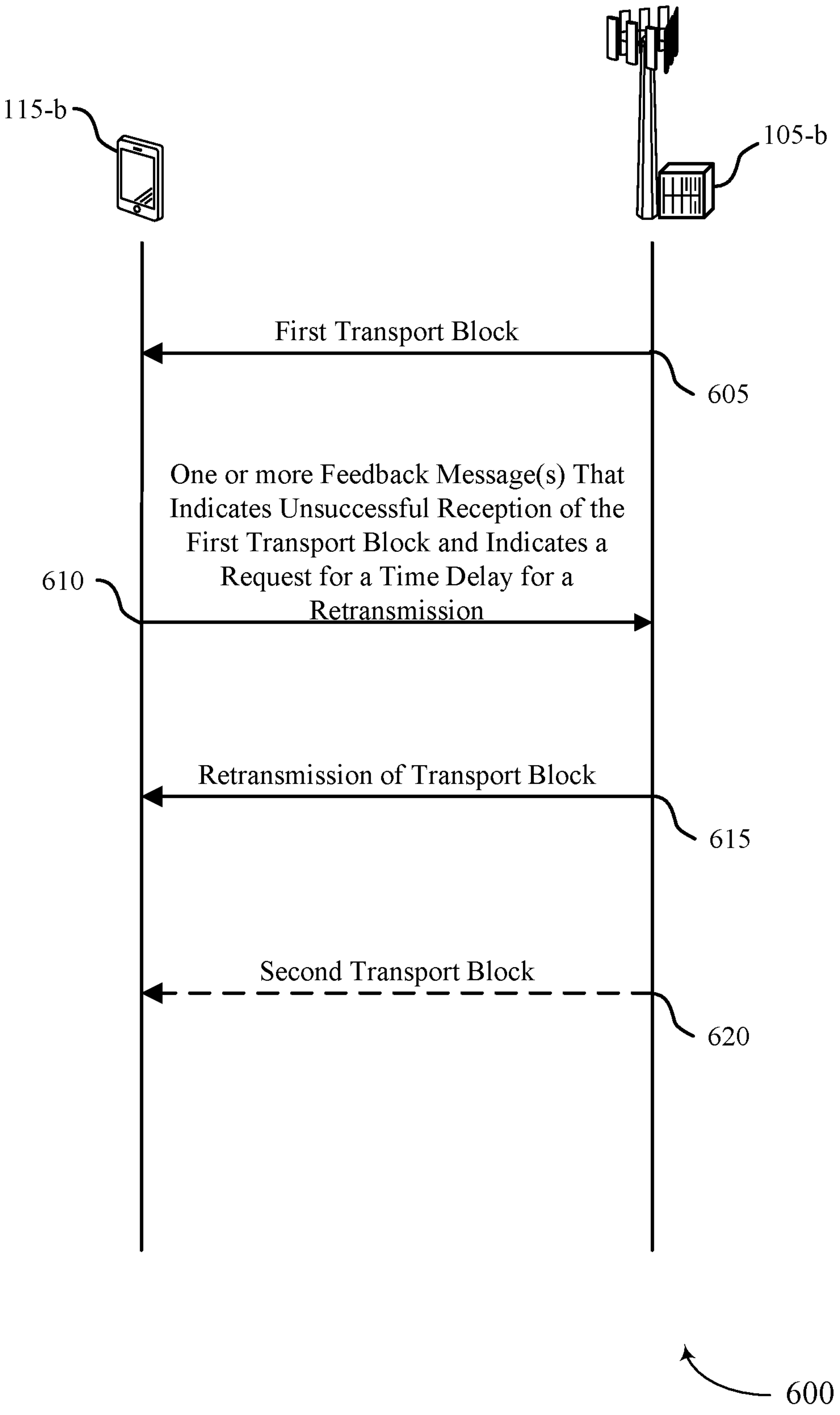
FIG. 6 shows an example of a process flow that supports HARQ design in accordance with one or more aspects of the present disclosure.

FIG. 6 shows an example of a process flow 600 that supports HARQ design in accordance with one or more aspects of the present disclosure. In some examples, the process flow 600 may implement or be implemented by aspects of the wireless communications systems 100 and 200 as described with reference to FIGS. 1 and 2, respectively. For example, the process flow 600 may be implemented by a network entity 105-*b*, which may be an example of the network entities 105 as described with reference to FIGS. 1 and 2. The process flow 600 may be implemented by a UE 115-*b*, which may be an example of the UEs as described with reference to FIGS. 1 and 2.

In some examples, the operations illustrated in process flow 600 may be performed by hardware (e.g., including circuitry, processing blocks, logic components, and other components), code such as processor-executable code (e.g., software executed by a processor), or any combination thereof. Alternative examples of the following may be implemented, where some steps are performed in a different order than described or are not performed at all. In some cases, steps may include additional features not mentioned below, or further steps may be added.

At 605, UE 115-*b* may receive, from the network entity 105-*b*, a first transport block.

At 610, the UE 115-*b* may transmit, to the network entity 105-*b* based at least in part on receiving the first transport block, one or more feedback messages that indicate that a reception of a portion of the first transport block was unsuccessful and indicate a request for a time delay associated with a retransmission of the first transport block. In some examples, for transmitting the one or more feedback messages, the UE 115-*b* may transmit a NACK feedback message that indicates that the reception of at least the portion of the first transport block was unsuccessful, and the UE 115-*b* may transmit a message that indicates the request for the time delay associated with the retransmission of the first transport block. In some cases, for transmitting the one or more feedback messages, the UE 115-*b* may transmit a NACK feedback message that indicates that the reception of at least the portion of the first transport block was unsuccessful and that indicates the request for the time delay associated with the retransmission of the first transport block.

At 615, the UE 115-*b* may receive, from the network entity 105-*b* based at least in part on transmitting the one or more feedback messages, the retransmission of the first transport block.

In some examples, the time delay may be a delayed timeline for a transmission of a first ACK or a first NACK associated with a reception of the retransmission of the first transport block. The UE 115-*b* may receive, from the network entity 105-*b* after transmitting the one or more feedback messages, a second transport block. The UE 115-*b* may transmit, to the network entity 105-*b* based on receiving the second transport block, a second ACK or a second NACK associated with a reception of the second transport block. In some cases, the transmission of the second ACK or the second NACK may be prior to the transmission of the first ACK or first NACK.

In some examples, the time delay may be an extended transmission duration for the retransmission of the first transport block. In some examples, for receiving the retransmission of the first transport block, the UE may receive, from the network entity 105-*b*, a second transport block, and the retransmission of the first transport block may be frequency-division multiplexed with the second transport block.

At 620, the UE 115-*b* may receive, from the network entity 105-*b*, a second transport block on a second component carrier, and the first transport block may be received on a first component carrier. In some examples, for transmitting the one or more feedback messages, the UE 115-*b* may transmit, to the network entity 105-*b* based on receiving the first transport block and the second transport block, one or more joint feedback messages associated with both the first transport block and the second transport block. In some cases, the one or more joint feedback messages may indicate that the reception of the portion of the first transport block was unsuccessful and that a reception of a portion of the second transport block was unsuccessful and may indicate the request for the time delay. In some examples, the UE 115-*b* may receive, from the network entity 105-*b* based on the reception of a portion of the second transport block was unsuccessful, a retransmission of the second transport block. In some cases, the retransmission of the second transport block may be received after the retransmission of the first transport block.

Figure 7:
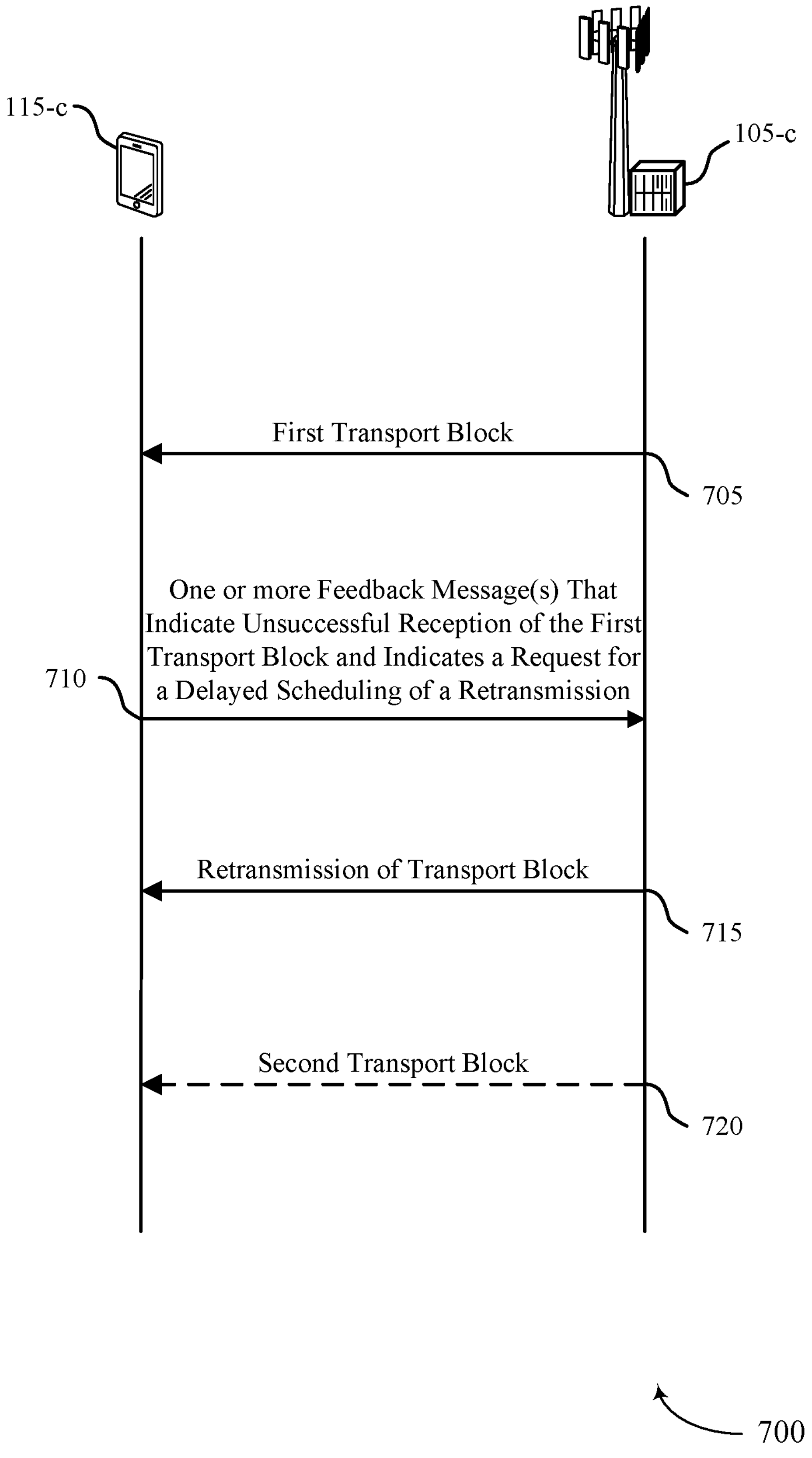
FIG. 7 shows an example of a process flow that supports HARQ design in accordance with one or more aspects of the present disclosure.

FIG. 7 shows an example of a process flow 700 that supports HARQ design in accordance with one or more aspects of the present disclosure. In some examples, the process flow 700 may implement or be implemented by aspects of the wireless communications systems 100 and 200 as described with reference to FIGS. 1 and 2, respectively. For example, the process flow 700 may be implemented by a network entity 105-*c*, which may be an example of the network entities 105 as described with reference to FIGS. 1 and 2. The process flow 700 may be implemented by a UE 115-*c*, which may be an example of the UEs as described with reference to FIGS. 1 and 2.

In some examples, the operations illustrated in process flow 700 may be performed by hardware (e.g., including circuitry, processing blocks, logic components, and other components), code such as processor-executable code (e.g., software executed by a processor), or any combination thereof. Alternative examples of the following may be implemented, where some steps are performed in a different order than described or are not performed at all. In some cases, steps may include additional features not mentioned below, or further steps may be added.

At 705, UE 115-*c* may receive, from the network entity 105-*c*, a first transport block.

At 710, the UE 115-*c* may transmit, to the network entity 105-*c* based at least in part on receiving the first transport block, one or more feedback messages that indicate that a reception of at least a portion of the first transport block was unsuccessful and indicate a request for a delayed scheduling of a retransmission of the first transport block. In some examples, for transmitting the one or more feedback messages, the UE 115-*c* may transmit a NACK feedback message that indicates that the reception of at least the portion of the first transport block was unsuccessful, and the UE 115-*c* may transmit a request the request for the delayed scheduling. In some cases, for transmitting the one or more feedback messages, the UE 115-*c* may transmit a NACK feedback message that indicates that the reception of at least the portion of the first transport block was unsuccessful and that indicates the request for the delayed scheduling.

At 715, the UE 115-*c* may receive, from the network entity 105-*c* based at least in part on transmitting the one or more feedback messages, the retransmission of the first transport block.

At 720, the UE 115-*c* may receive, from the network entity 105-*c*, a second transport block on a second component carrier, and the first transport block may be received on a first component carrier. In some examples, for transmitting the one or more feedback messages, the UE 115-*c* may transmit, to the network entity 105-*c* based on receiving the first transport block and the second transport block, one or more joint feedback messages associated with both the first transport block and the second transport block. In some cases, the one or more joint feedback messages may indicate that the reception of the portion of the first transport block was unsuccessful and that a reception of a portion of the second transport block was unsuccessful and may indicate the request for the delayed scheduling.

Figure 8:
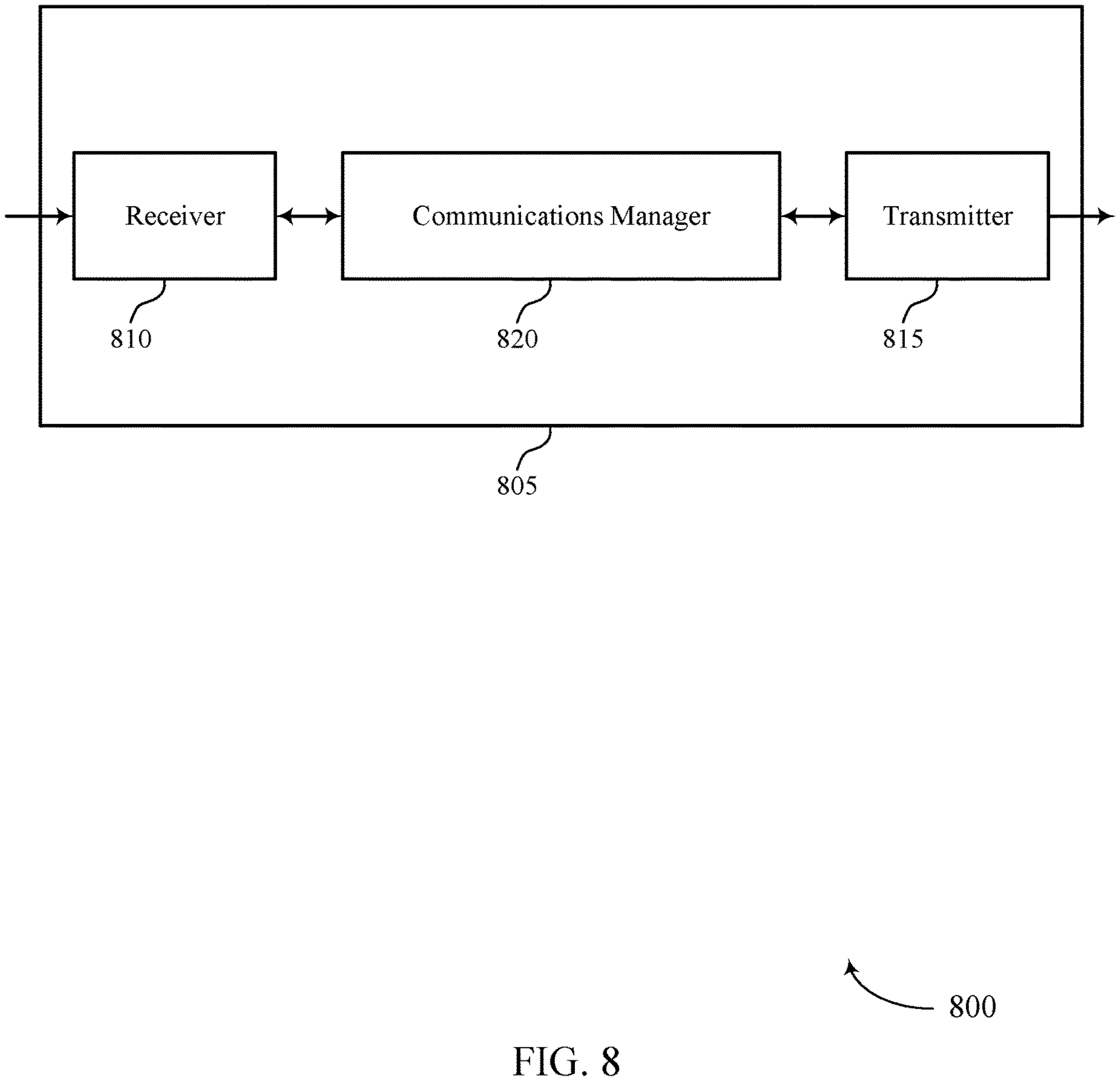
FIGS. 8 and 9 show block diagrams of devices that support HARQ design in accordance with one or more aspects of the present disclosure.

FIG. 8 shows a block diagram 800 of a device 805 that supports HARQ design in accordance with one or more aspects of the present disclosure. The device 805 may be an example of aspects of a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to HARQ design). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to HARQ design). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of HARQ design as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code such as processor-executable code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication in accordance with examples as disclosed herein. For example, the communications manager 820 is capable of, configured to, or operable to support a means for receiving, from a network entity, a first transport block. The communications manager 820 is capable of, configured to, or operable to support a means for transmitting, to the network entity based on receiving the first transport block, one or more feedback messages that indicate that a reception of at least a portion of the first transport block was unsuccessful and indicate a request for a time delay associated with a retransmission of the first transport block. The communications manager 820 is capable of, configured to, or operable to support a means for receiving, from the network entity based on transmitting the one or more feedback messages, the retransmission of the first transport block.

Additionally, or alternatively, the communications manager 820 may support wireless communication in accordance with examples as disclosed herein. For example, the communications manager 820 is capable of, configured to, or operable to support a means for receiving, from a network entity, a first transport block. The communications manager 820 is capable of, configured to, or operable to support a means for transmitting, to the network entity based on receiving the first transport block, one or more feedback messages that indicate that a reception of at least a portion of the first transport block was unsuccessful and indicate a request for a delayed scheduling of a retransmission of the first transport block. The communications manager 820 is capable of, configured to, or operable to support a means for receiving, from the network entity based on transmitting the one or more feedback messages, the retransmission of the first transport block.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for more efficient utilization of communication resources.

Figure 9:
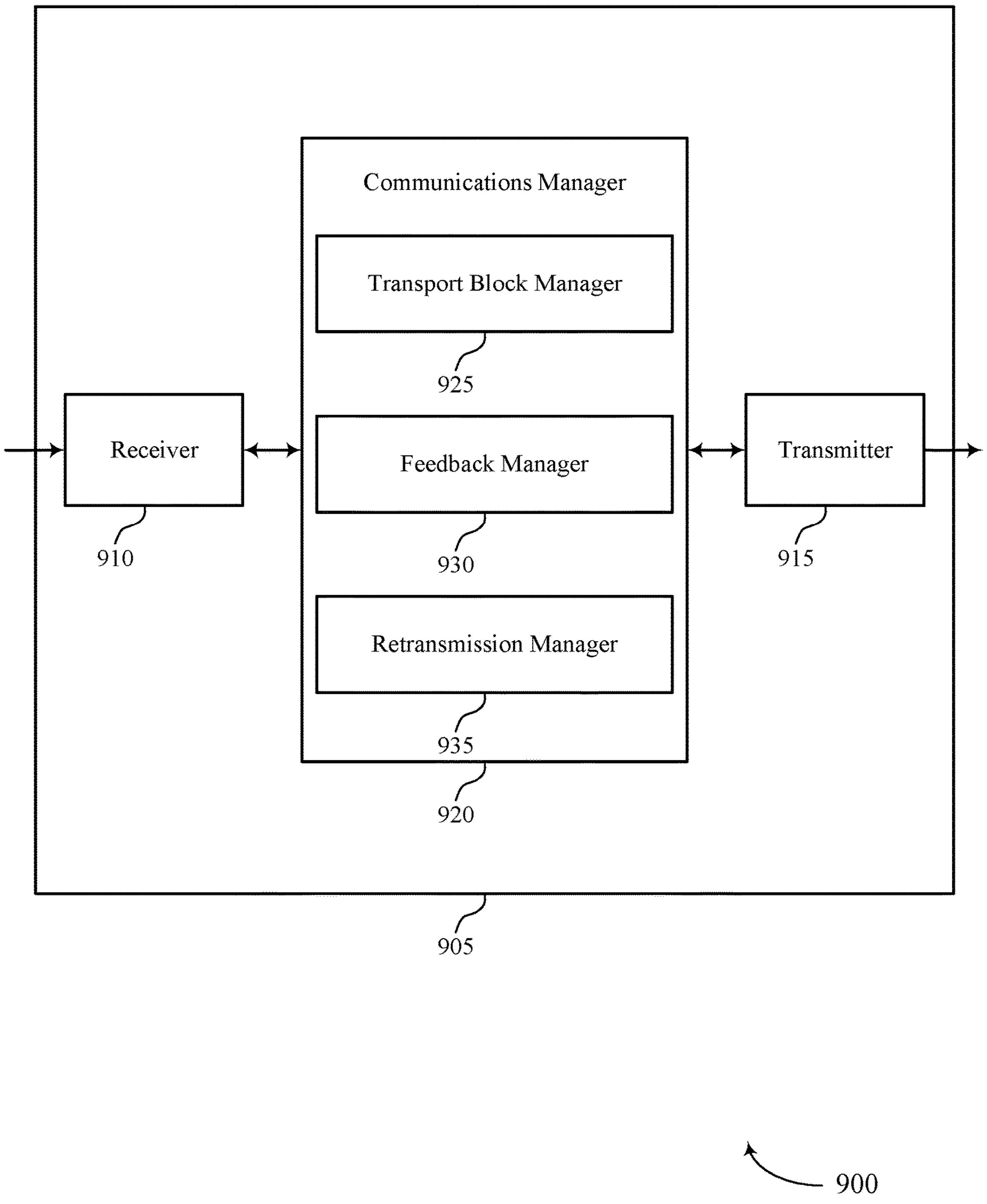

FIG. 9 shows a block diagram 900 of a device 905 that supports HARQ design in accordance with one or more aspects of the present disclosure. The device 905 may be an example of aspects of a device 805 or a UE 115 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to HARQ design). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to HARQ design). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of HARQ design as described herein. For example, the communications manager 920 may include a transport block manager 925, a feedback manager 930, a retransmission manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. The transport block manager 925 is capable of, configured to, or operable to support a means for receiving, from a network entity, a first transport block. The feedback manager 930 is capable of, configured to, or operable to support a means for transmitting, to the network entity based on receiving the first transport block, one or more feedback messages that indicate that a reception of at least a portion of the first transport block was unsuccessful and indicate a request for a time delay associated with a retransmission of the first transport block. The retransmission manager 935 is capable of, configured to, or operable to support a means for receiving, from the network entity based on transmitting the one or more feedback messages, the retransmission of the first transport block.

Additionally, or alternatively, the communications manager 920 may support wireless communication in accordance with examples as disclosed herein. The transport block manager 925 is capable of, configured to, or operable to support a means for receiving, from a network entity, a first transport block. The feedback manager 930 is capable of, configured to, or operable to support a means for transmitting, to the network entity based on receiving the first transport block, one or more feedback messages that indicate that a reception of at least a portion of the first transport block was unsuccessful and indicate a request for a delayed scheduling of a retransmission of the first transport block. The retransmission manager 935 is capable of, configured to, or operable to support a means for receive, from the network entity based on transmitting the one or more feedback messages, the retransmission of the first transport block.

Figure 10:
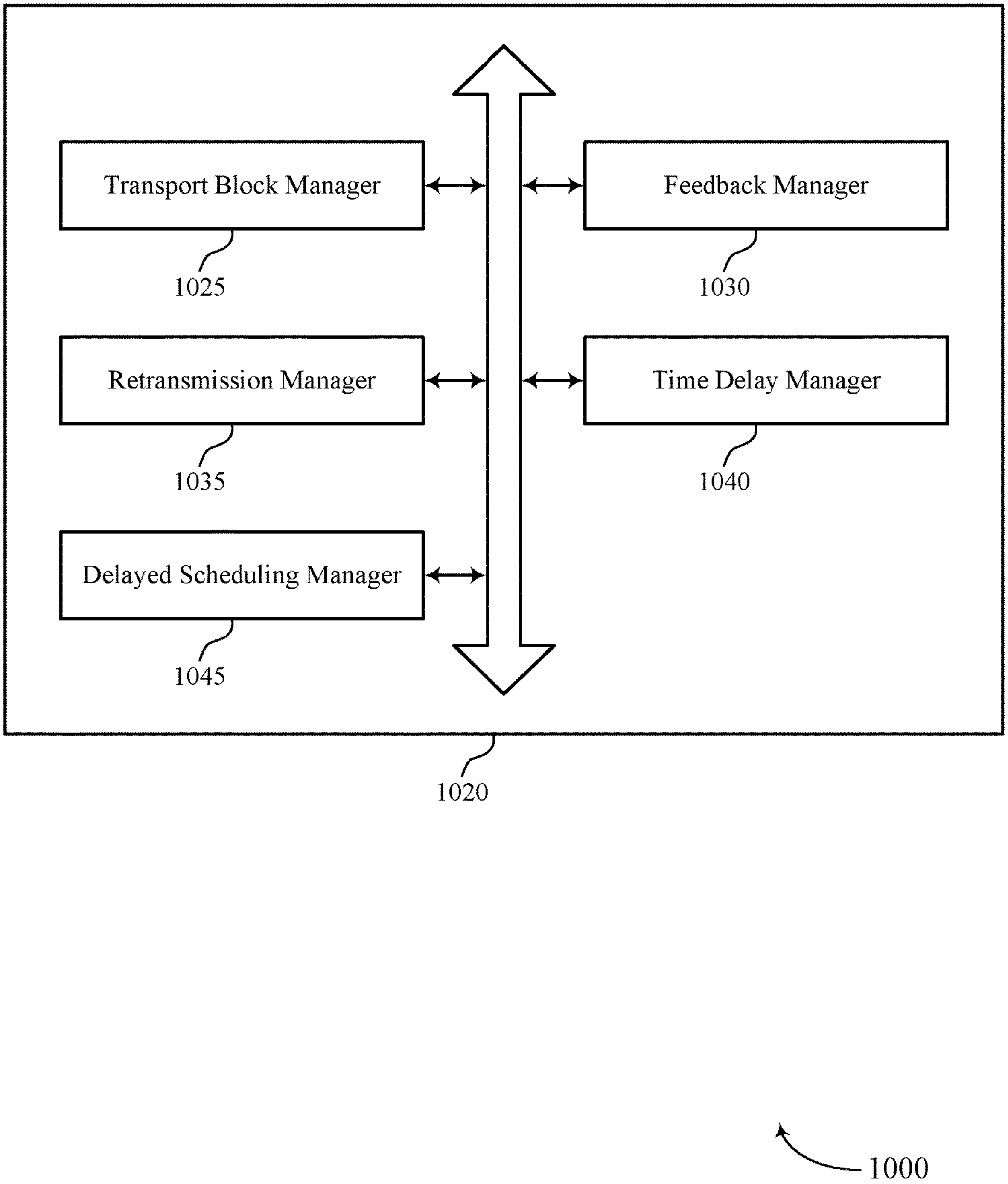
FIG. 10 shows a block diagram of a communications manager that supports HARQ design in accordance with one or more aspects of the present disclosure.

FIG. 10 shows a block diagram 1000 of a communications manager 1020 that supports HARQ design in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of HARQ design as described herein. For example, the communications manager 1020 may include a transport block manager 1025, a feedback manager 1030, a retransmission manager 1035, a time delay manager 1040, a delayed scheduling manager 1045, or any combination thereof. Each of these components, or components or subcomponents thereof (e.g., one or more processors, one or more memories), may communicate, directly or indirectly, with one another (e.g., via one or more buses).

The communications manager 1020 may support wireless communication in accordance with examples as disclosed herein. The transport block manager 1025 is capable of, configured to, or operable to support a means for receiving, from a network entity, a first transport block. The feedback manager 1030 is capable of, configured to, or operable to support a means for transmitting, to the network entity based on receiving the first transport block, one or more feedback messages that indicate that a reception of at least a portion of the first transport block was unsuccessful and indicate a request for a time delay associated with a retransmission of the first transport block. The retransmission manager 1035 is capable of, configured to, or operable to support a means for receiving, from the network entity based on transmitting the one or more feedback messages, the retransmission of the first transport block.

In some examples, the time delay includes a delayed timeline for a transmission of a first acknowledgment feedback or a first negative acknowledgment feedback associated with a reception of the retransmission of the first transport block.

In some examples, the transport block manager 1025 is capable of, configured to, or operable to support a means for receiving, from the network entity after transmitting the one or more feedback messages, a second transport block. In some examples, the feedback manager 1030 is capable of, configured to, or operable to support a means for transmitting, to the network entity based on receiving the second transport block, a second acknowledgment feedback or a second negative acknowledgment feedback associated with a reception of the second transport block, where the transmission of the second acknowledgment feedback or the second negative acknowledgment feedback occurs prior to the transmission of the first acknowledgment feedback or the first negative acknowledgment feedback.

In some examples, the time delay includes an extended transmission duration for the retransmission of the first transport block.

In some examples, the transport block manager 1025 is capable of, configured to, or operable to support a means for receiving, from the network entity based on transmitting the one or more feedback messages, a second transport block, where the retransmission of the first transport block is frequency-division multiplexed with the second transport block.

In some examples, the transport block manager 1025 is capable of, configured to, or operable to support a means for receiving, from the network entity, a second transport block on a second component carrier, where the first transport block is received on a first component carrier.

In some examples, to support transmitting the one or more feedback messages, the feedback manager 1030 is capable of, configured to, or operable to support a means for transmitting, to the network entity based on receiving the first transport block and the second transport block, one or more joint feedback messages associated with both the first transport block and the second transport block, where the one or more joint feedback messages indicate that the reception of at least the portion of the first transport block was unsuccessful and that a reception of at least the portion of the second transport block was unsuccessful and indicate the request for the time delay.

In some examples, the retransmission manager 1035 is capable of, configured to, or operable to support a means for receiving, from the network entity based on a reception of at least a portion of the second transport block was unsuccessful, a retransmission of the second transport block, where the retransmission of the second transport block is received after the retransmission of the first transport block.

In some examples, to support transmitting the one or more feedback messages, the feedback manager 1030 is capable of, configured to, or operable to support a means for transmitting a negative acknowledgment feedback message that indicates that the reception of at least the portion of the first transport block was unsuccessful. In some examples, to support transmitting the one or more feedback messages, the time delay manager 1040 is capable of, configured to, or operable to support a means for transmitting a message that indicates the request for the time delay associated with the retransmission of the first transport block.

In some examples, to support transmitting the one or more feedback messages, the feedback manager 1030 is capable of, configured to, or operable to support a means for transmitting a negative acknowledgment feedback message that indicates that the reception of at least the portion of the first transport block was unsuccessful and that indicates the request for the time delay associated with the retransmission of the first transport block.

Additionally, or alternatively, the communications manager 1020 may support wireless communication in accordance with examples as disclosed herein. In some examples, the transport block manager 1025 is capable of, configured to, or operable to support a means for receiving, from a network entity, a first transport block. In some examples, the feedback manager 1030 is capable of, configured to, or operable to support a means for transmitting, to the network entity based on receiving the first transport block, one or more feedback messages that indicate that a reception of at least a portion of the first transport block was unsuccessful and indicate a request for a delayed scheduling of a retransmission of the first transport block. In some examples, the retransmission manager 1035 is capable of, configured to, or operable to support a means for receive, from the network entity based on transmitting the one or more feedback messages, the retransmission of the first transport block.

In some examples, the transport block manager 1025 is capable of, configured to, or operable to support a means for receiving, from the network entity, a second transport block on a second component carrier, where the first transport block is received on a first component carrier.

In some examples, to support transmitting the one or more feedback messages, the feedback manager 1030 is capable of, configured to, or operable to support a means for transmitting, to the network entity based on receiving the first transport block and receiving the second transport block, one or more joint feedback messages associated with both the first transport block and the second transport block, where the one or more joint feedback messages indicate that the reception of at least the portion of the first transport block and indicate that a reception of at least the portion of the second transport block was unsuccessful and indicate the request for the delayed scheduling.

In some examples, to support transmitting the one or more feedback messages, the feedback manager 1030 is capable of, configured to, or operable to support a means for transmitting a negative acknowledgment feedback message that indicates that the reception of at least the portion of the first transport block was unsuccessful. In some examples, to support transmitting the one or more feedback messages, the delayed scheduling manager 1045 is capable of, configured to, or operable to support a means for transmitting a request message that indicates the request for the delayed scheduling.

In some examples, to support transmitting the one or more feedback messages, the feedback manager 1030 is capable of, configured to, or operable to support a means for transmitting a negative acknowledgment feedback message that indicates that the reception of at least the portion of the first transport block was unsuccessful and that indicates the request for the delayed scheduling.

Figure 11:
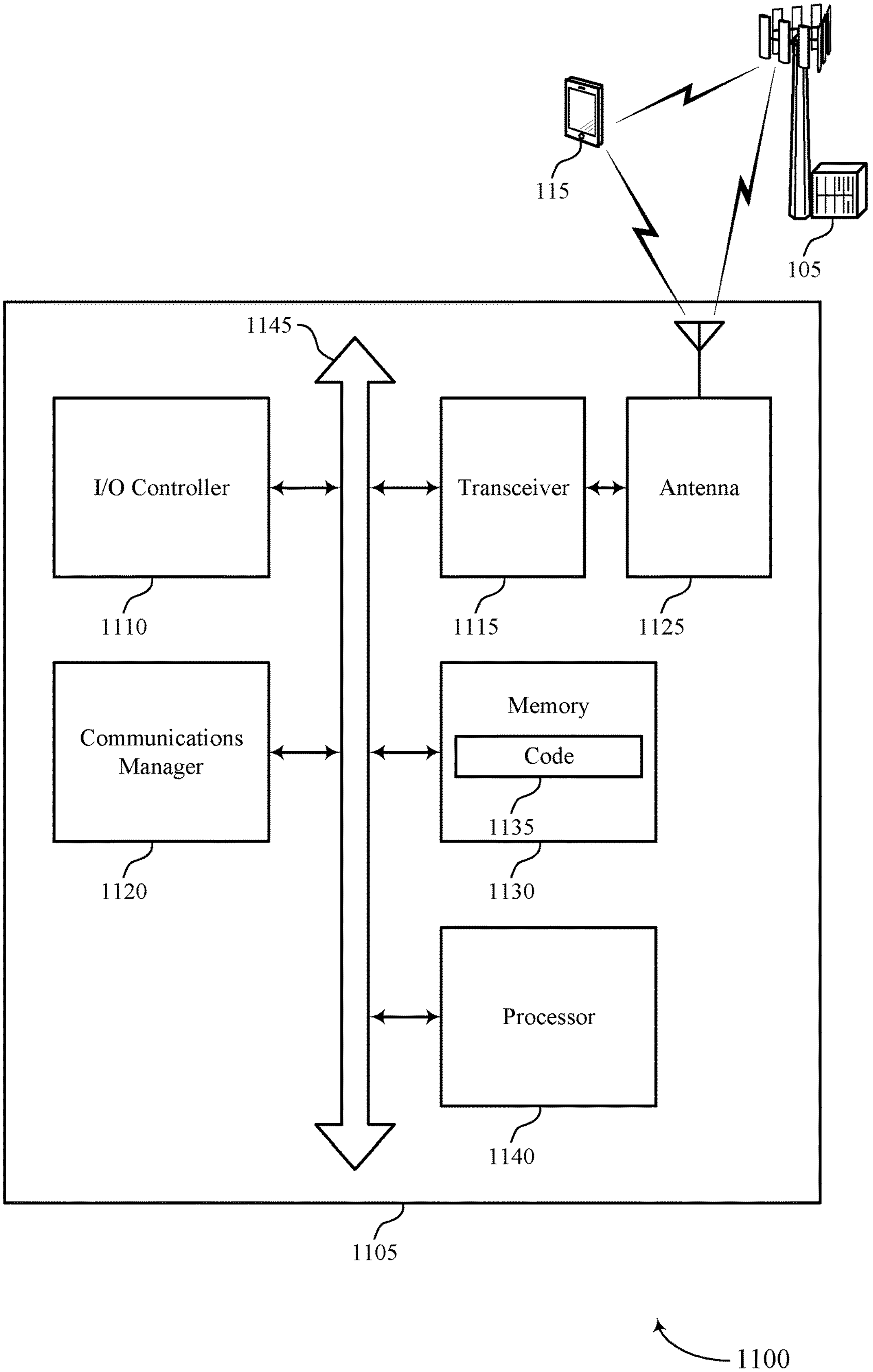
FIG. 11 shows a diagram of a system including a device that supports HARQ design in accordance with one or more aspects of the present disclosure.

FIG. 11 shows a diagram of a system 1100 including a device 1105 that supports HARQ design in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, at least one memory 1130, code 1135, and at least one processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of one or more processors, such as the at least one processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The at least one memory 1130 may include random access memory (RAM) and read-only memory (ROM). The at least one memory 1130 may store computer-readable, computer-executable code 1135 including instructions that, when executed by the at least one processor 1140, cause the device 1105 to perform various functions described herein. The code 1135 may be stored in a non-transitory computer-readable medium such as system memory or another type of memory. In some cases, the code 1135 may not be directly executable by the at least one processor 1140 but may cause a computer (e.g., when compiled and executed) to perform functions described herein. In some cases, the at least one memory 1130 may contain, among other things, a basic I/O system (BIOS) which may control basic hardware or software operation such as the interaction with peripheral components or devices.

The at least one processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1140 may be configured to operate a memory array using a memory controller. In some other cases, a memory controller may be integrated into the at least one processor 1140. The at least one processor 1140 may be configured to execute computer-readable instructions stored in a memory (e.g., the at least one memory 1130) to cause the device 1105 to perform various functions (e.g., functions or tasks supporting HARQ design). For example, the device 1105 or a component of the device 1105 may include at least one processor 1140 and at least one memory 1130 coupled with or to the at least one processor 1140, the at least one processor 1140 and at least one memory 1130 configured to perform various functions described herein. In some examples, the at least one processor 1140 may include multiple processors and the at least one memory 1130 may include multiple memories. One or more of the multiple processors may be coupled with one or more of the multiple memories, which may, individually or collectively, be configured to perform various functions herein. In some examples, the at least one processor 1140 may be a component of a processing system, which may refer to a system (such as a series) of machines, circuitry (including, for example, one or both of processor circuitry (which may include the at least one processor 1140) and memory circuitry (which may include the at least one memory 1130)), or components, that receives or obtains inputs and processes the inputs to produce, generate, or obtain a set of outputs. The processing system may be configured to perform one or more of the functions described herein. For example, the at least one processor 1140 or a processing system including the at least one processor 1140 may be configured to, configurable to, or operable to cause the device 1105 to perform one or more of the functions described herein. Further, as described herein, being “configured to,” being “configurable to,” and being “operable to” may be used interchangeably and may be associated with a capability, when executing code stored in the at least one memory 1130 or otherwise, to perform one or more of the functions described herein.

The communications manager 1120 may support wireless communication in accordance with examples as disclosed herein. For example, the communications manager 1120 is capable of, configured to, or operable to support a means for receiving, from a network entity, a first transport block. The communications manager 1120 is capable of, configured to, or operable to support a means for transmitting, to the network entity based on receiving the first transport block, one or more feedback messages that indicate that a reception of at least a portion of the first transport block was unsuccessful and indicate a request for a time delay associated with a retransmission of the first transport block. The communications manager 1120 is capable of, configured to, or operable to support a means for receiving, from the network entity based on transmitting the one or more feedback messages, the retransmission of the first transport block.

Additionally, or alternatively, the communications manager 1120 may support wireless communication in accordance with examples as disclosed herein. For example, the communications manager 1120 is capable of, configured to, or operable to support a means for receiving, from a network entity, a first transport block. The communications manager 1120 is capable of, configured to, or operable to support a means for transmitting, to the network entity based on receiving the first transport block, one or more feedback messages that indicate that a reception of at least a portion of the first transport block was unsuccessful and indicate a request for a delayed scheduling of a retransmission of the first transport block. The communications manager 1120 is capable of, configured to, or operable to support a means for receiving, from the network entity based on transmitting the one or more feedback messages, the retransmission of the first transport block.

By including or configuring the communications manager 1120 in accordance with examples as described herein, the device 1105 may support techniques for improved communication reliability, reduced latency, more efficient utilization of communication resources, and improved coordination between devices.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the at least one processor 1140, the at least one memory 1130, the code 1135, or any combination thereof. For example, the code 1135 may include instructions executable by the at least one processor 1140 to cause the device 1105 to perform various aspects of HARQ design as described herein, or the at least one processor 1140 and the at least one memory 1130 may be otherwise configured to, individually or collectively, perform or support such operations.

Figure 12:
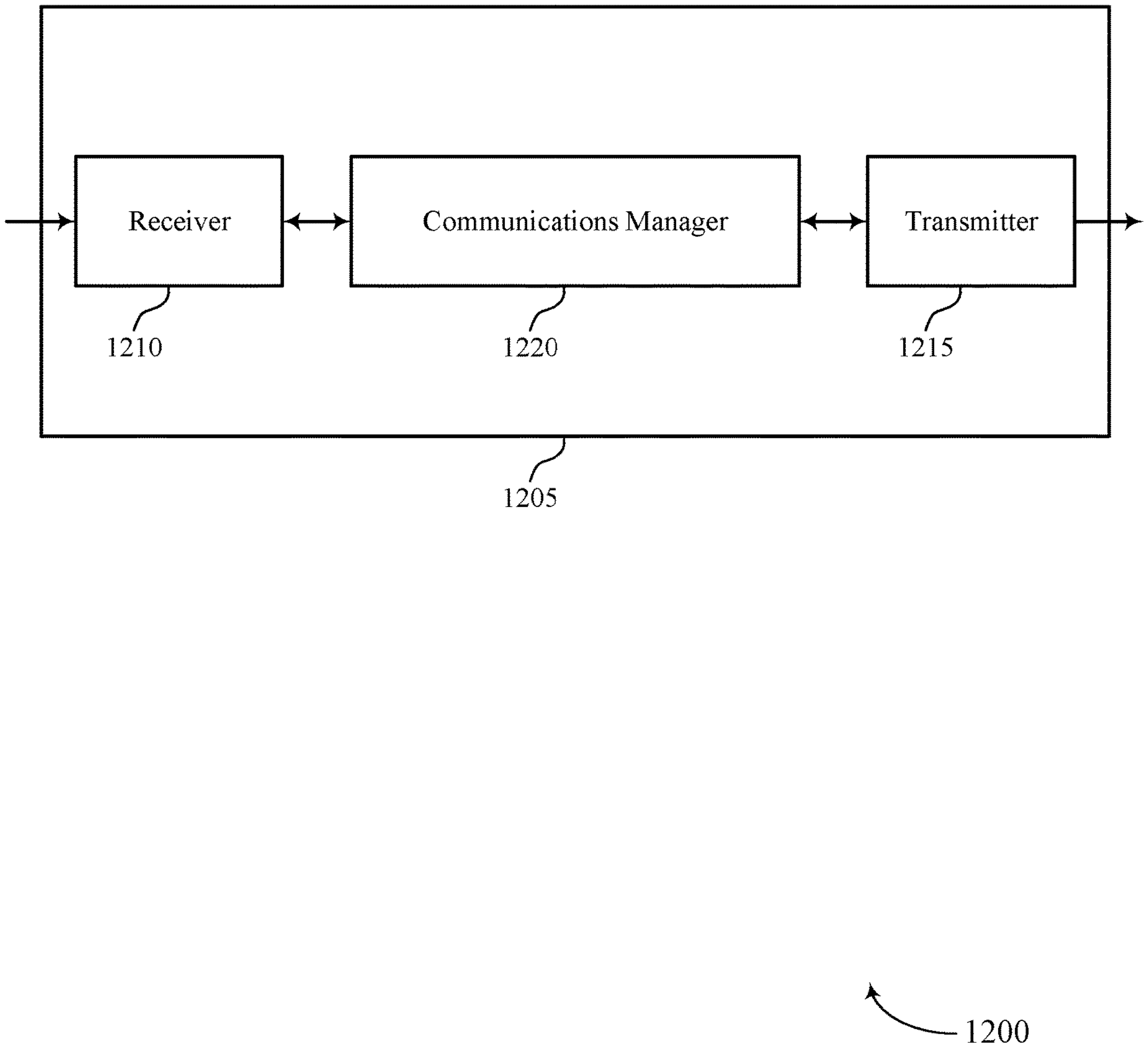
FIGS. 12 and 13 show block diagrams of devices that support HARQ design in accordance with one or more aspects of the present disclosure.

FIG. 12 shows a block diagram 1200 of a device 1205 that supports HARQ design in accordance with one or more aspects of the present disclosure. The device 1205 may be an example of aspects of a network entity 105 as described herein. The device 1205 may include a receiver 1210, a transmitter 1215, and a communications manager 1220. The device 1205, or one or more components of the device 1205 (e.g., the receiver 1210, the transmitter 1215, and the communications manager 1220), may include at least one processor, which may be coupled with at least one memory, to, individually or collectively, support or enable the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of HARQ design as described herein. For example, the communications manager 1220, the receiver 1210, the transmitter 1215, or various combinations or components thereof may be capable of performing one or more of the functions described herein.

In some examples, the communications manager 1220, the receiver 1210, the transmitter 1215, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1220, the receiver 1210, the transmitter 1215, or various combinations or components thereof may be implemented in code (e.g., as communications management software or firmware) executed by at least one processor. If implemented in code executed by at least one processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication in accordance with examples as disclosed herein. For example, the communications manager 1220 is capable of, configured to, or operable to support a means for outputting, to a UE, a first transport block. The communications manager 1220 is capable of, configured to, or operable to support a means for obtaining, from the UE based on outputting the first transport block, one or more feedback messages that indicate that a reception of at least a portion of the first transport block was unsuccessful and indicate a request for a time delay associated with a retransmission of the first transport block. The communications manager 1220 is capable of, configured to, or operable to support a means for outputting, to the UE based on obtaining the one or more feedback messages, the retransmission of the first transport block.

Additionally, or alternatively, the communications manager 1220 may support wireless communication in accordance with examples as disclosed herein. For example, the communications manager 1220 is capable of, configured to, or operable to support a means for outputting, to a UE, a first transport block. The communications manager 1220 is capable of, configured to, or operable to support a means for obtaining, from the UE based on outputting the first transport block, one or more feedback messages that indicate that a reception of at least a portion of the first transport block was unsuccessful and indicate a request for a delayed scheduling of a retransmission of the first transport block. The communications manager 1220 is capable of, configured to, or operable to support a means for outputting, to the UE based on obtaining the one or more feedback messages, the retransmission of the first transport block.

By including or configuring the communications manager 1220 in accordance with examples as described herein, the device 1205 (e.g., at least one processor controlling or otherwise coupled with the receiver 1210, the transmitter 1215, the communications manager 1220, or a combination thereof) may support techniques for more efficient utilization of communication resources.

Figure 13:
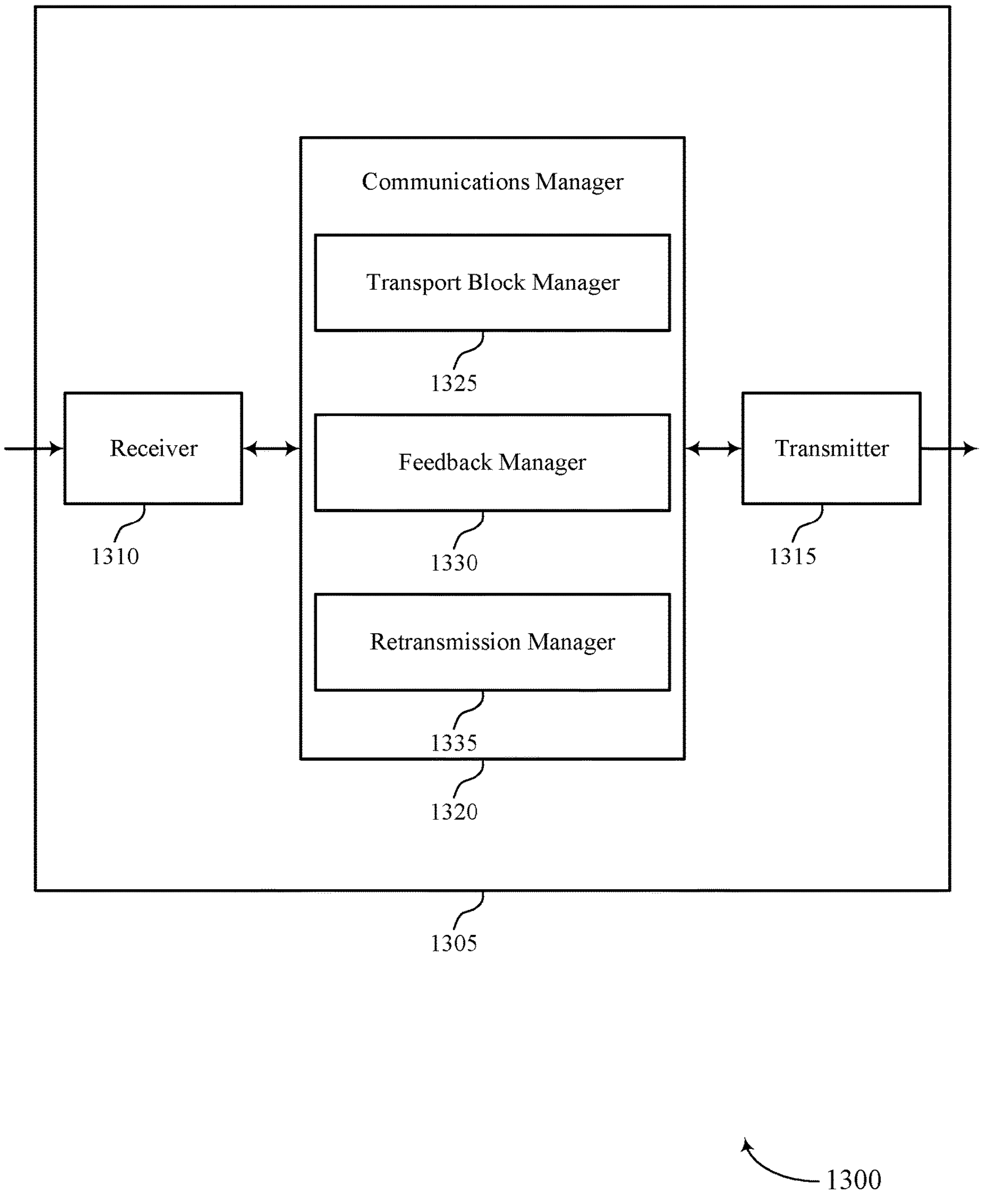

FIG. 13 shows a block diagram 1300 of a device 1305 that supports HARQ design in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305, or one or more components of the device 1305 (e.g., the receiver 1310, the transmitter 1315, and the communications manager 1320), may include at least one processor, which may be coupled with at least one memory, to support the described techniques. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of HARQ design as described herein. For example, the communications manager 1320 may include a transport block manager 1325, a feedback manager 1330, a retransmission manager 1335, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication in accordance with examples as disclosed herein. The transport block manager 1325 is capable of, configured to, or operable to support a means for outputting, to a UE, a first transport block. The feedback manager 1330 is capable of, configured to, or operable to support a means for obtaining, from the UE based on outputting the first transport block, one or more feedback messages that indicate that a reception of at least a portion of the first transport block was unsuccessful and indicate a request for a time delay associated with a retransmission of the first transport block. The retransmission manager 1335 is capable of, configured to, or operable to support a means for outputting, to the UE based on obtaining the one or more feedback messages, the retransmission of the first transport block.

Additionally, or alternatively, the communications manager 1320 may support wireless communication in accordance with examples as disclosed herein. The transport block manager 1325 is capable of, configured to, or operable to support a means for outputting, to a UE, a first transport block. The feedback manager 1330 is capable of, configured to, or operable to support a means for obtaining, from the UE based on outputting the first transport block, one or more feedback messages that indicate that a reception of at least a portion of the first transport block was unsuccessful and indicate a request for a delayed scheduling of a retransmission of the first transport block. The retransmission manager 1335 is capable of, configured to, or operable to support a means for outputting, to the UE based on obtaining the one or more feedback messages, the retransmission of the first transport block.

Figure 14:
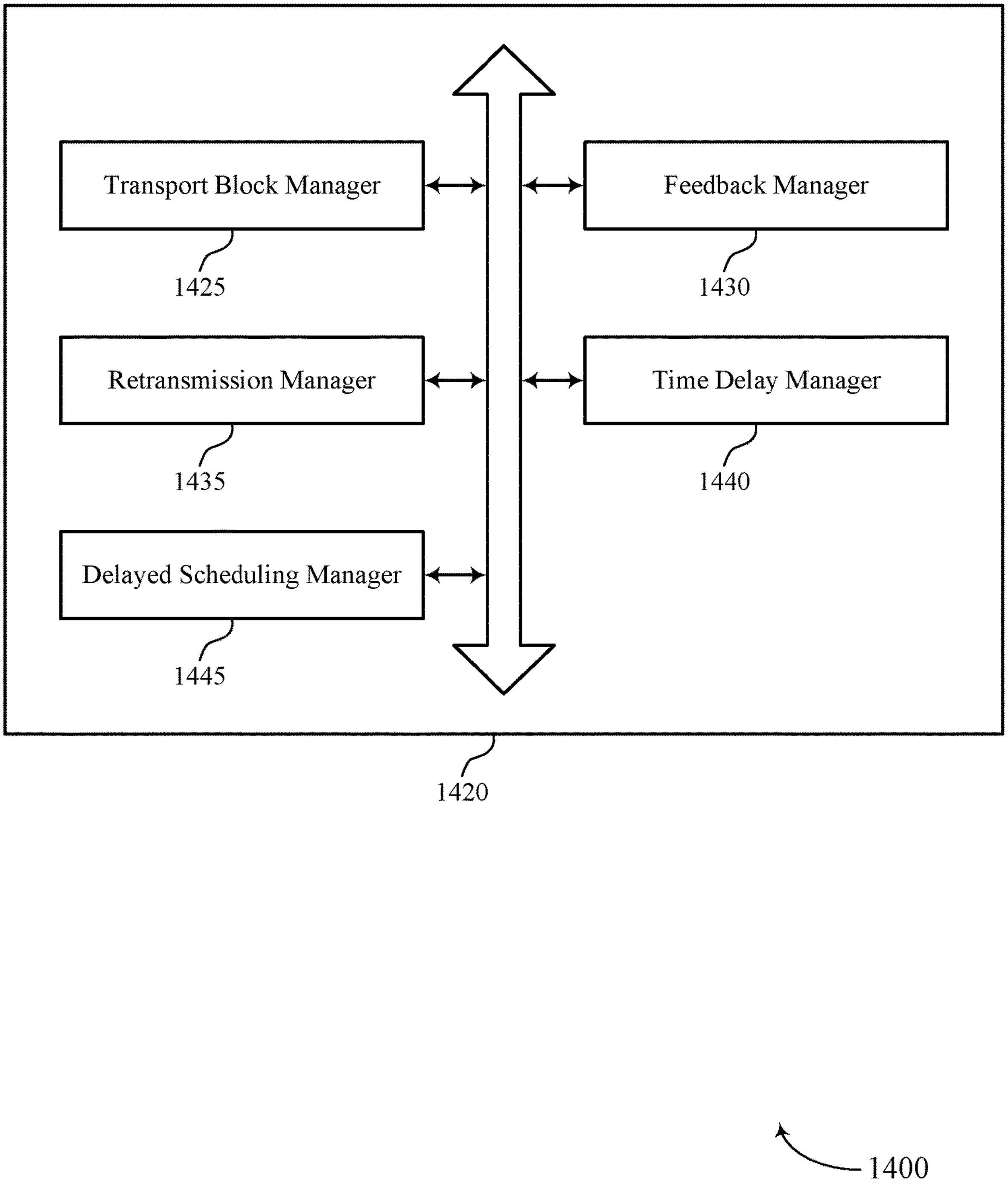
FIG. 14 shows a block diagram of a communications manager that supports HARQ design in accordance with one or more aspects of the present disclosure.

FIG. 14 shows a block diagram 1400 of a communications manager 1420 that supports HARQ design in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of HARQ design as described herein. For example, the communications manager 1420 may include a transport block manager 1425, a feedback manager 1430, a retransmission manager 1435, a time delay manager 1440, a delayed scheduling manager 1445, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communication in accordance with examples as disclosed herein. The transport block manager 1425 is capable of, configured to, or operable to support a means for outputting, to a UE, a first transport block. The feedback manager 1430 is capable of, configured to, or operable to support a means for obtaining, from the UE based on outputting the first transport block, one or more feedback messages that indicate that a reception of at least a portion of the first transport block was unsuccessful and indicate a request for a time delay associated with a retransmission of the first transport block. The retransmission manager 1435 is capable of, configured to, or operable to support a means for outputting, to the UE based on obtaining the one or more feedback messages, the retransmission of the first transport block.

In some examples, the time delay includes a delayed timeline for obtaining a first acknowledgment feedback or a first negative acknowledgment feedback associated with the retransmission of the first transport block.

In some examples, the transport block manager 1425 is capable of, configured to, or operable to support a means for outputting, to the UE based on obtaining the one or more feedback messages, a second transport block. In some examples, the feedback manager 1430 is capable of, configured to, or operable to support a means for obtaining, from the UE based on outputting the second transport block, a second acknowledgment feedback or a second negative acknowledgment feedback associated with the second transport block, where the obtaining of the second acknowledgment feedback or the second negative acknowledgment feedback occurs prior to the obtaining of the first acknowledgment feedback or the first negative acknowledgment feedback.

In some examples, the time delay includes an extended transmission duration for the retransmission of the first transport block.

In some examples, the transport block manager 1425 is capable of, configured to, or operable to support a means for outputting, to the UE based on obtaining the one or more feedback messages, a second transport block and the retransmission of the first transport block, where the retransmission of the first transport block is frequency-division multiplexed with the second transport block.

In some examples, the transport block manager 1425 is capable of, configured to, or operable to support a means for outputting, to the UE, a second transport block on a second component carrier, where the first transport block is outputted on a first component carrier.

In some examples, to support obtaining the one or more feedback messages, the feedback manager 1430 is capable of, configured to, or operable to support a means for obtaining, from the UE based on outputting the first transport block and outputting the second transport block, one or more joint feedback messages associated with both the first transport block and the second transport block, where the one or more joint feedback messages indicate that the reception of at least the portion of the first transport block and a reception of at least the portion of the second transport block was unsuccessful and indicate the request for the time delay.

In some examples, the feedback manager 1430 is capable of, configured to, or operable to support a means for obtaining, from the UE based on outputting the first transport block and outputting the second transport block, one or more second feedback messages associated with the second transport block, where the one or more second feedback messages indicate that a reception of at least the portion of the second transport block was unsuccessful. In some examples, the retransmission manager 1435 is capable of, configured to, or operable to support a means for outputting, to the UE based on the reception of the one or more second feedback messages, a retransmission of the second transport block, where the retransmission of the second transport block is outputted after the retransmission of the first transport block.

In some examples, to support obtaining the one or more feedback messages, the feedback manager 1430 is capable of, configured to, or operable to support a means for obtaining a negative acknowledgment feedback message that indicates that the reception of at least the portion of the first transport block was unsuccessful. In some examples, to support obtaining the one or more feedback messages, the time delay manager 1440 is capable of, configured to, or operable to support a means for obtaining a request message that indicates the request for the time delay associated with the retransmission of the first transport block.

In some examples, to support obtaining the one or more feedback messages, the feedback manager 1430 is capable of, configured to, or operable to support a means for obtaining a negative acknowledgment feedback message that indicates that the reception of at least the portion of the first transport block was unsuccessful and that indicates the request for the time delay associated with the retransmission of the first transport block.

Additionally, or alternatively, the communications manager 1420 may support wireless communication in accordance with examples as disclosed herein. In some examples, the transport block manager 1425 is capable of, configured to, or operable to support a means for outputting, to a UE, a first transport block. In some examples, the feedback manager 1430 is capable of, configured to, or operable to support a means for obtaining, from the UE based on outputting the first transport block, one or more feedback messages that indicate that a reception of at least a portion of the first transport block was unsuccessful and indicate a request for a delayed scheduling of a retransmission of the first transport block. In some examples, the retransmission manager 1435 is capable of, configured to, or operable to support a means for outputting, to the UE based on obtaining the one or more feedback messages, the retransmission of the first transport block.

In some examples, the transport block manager 1425 is capable of, configured to, or operable to support a means for outputting, to the UE, a second transport block on a second component carrier, where the first transport block is outputted on a first component carrier.

In some examples, to support obtaining the one or more feedback messages, the feedback manager 1430 is capable of, configured to, or operable to support a means for obtaining, from the UE based on outputting the first transport block and outputting the second transport block, one or more joint feedback messages associated with both the first transport block and the second transport block, where the one or more joint feedback messages indicate that the reception of at least the portion of the first transport block and a reception of at least the portion of the second transport block was unsuccessful and indicate the request for the delayed scheduling.

In some examples, to support obtaining the one or more feedback messages, the feedback manager 1430 is capable of, configured to, or operable to support a means for obtaining a negative acknowledgment feedback message that indicates that the reception of at least the portion of the first transport block was unsuccessful. In some examples, to support obtaining the one or more feedback messages, the delayed scheduling manager 1445 is capable of, configured to, or operable to support a means for obtaining a request message that indicates the request for the delayed scheduling.

In some examples, to support obtaining the one or more feedback messages, the feedback manager 1430 is capable of, configured to, or operable to support a means for obtaining a negative acknowledgment feedback message that indicates that the reception of at least the portion of the first transport block was unsuccessful and that indicates the request for the delayed scheduling.

Figure 15:
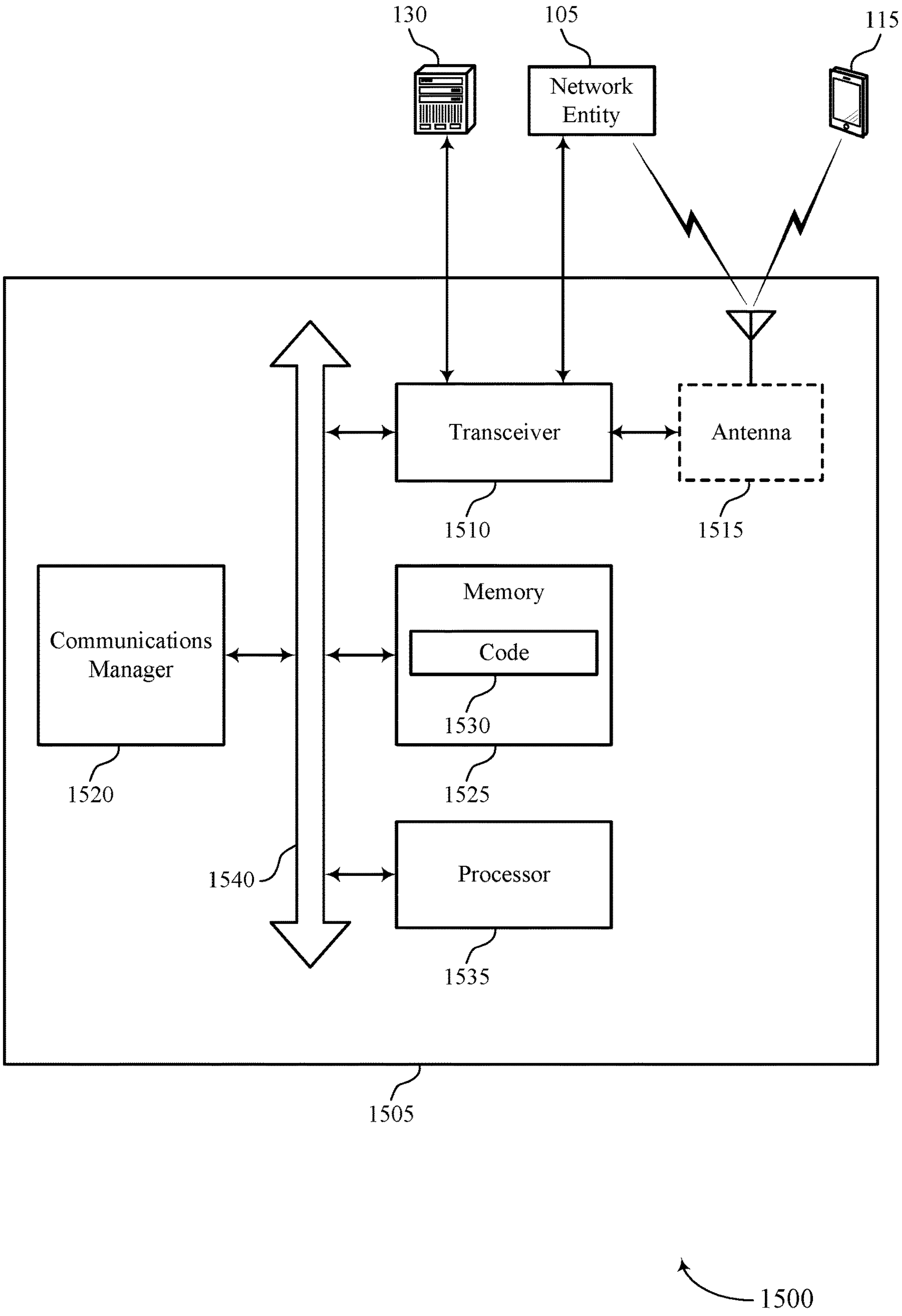
FIG. 15 shows a diagram of a system including a device that supports HARQ design in accordance with one or more aspects of the present disclosure.

FIG. 15 shows a diagram of a system 1500 including a device 1505 that supports HARQ design in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, at least one memory 1525, code 1530, and at least one processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or one or more memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or one or more memory components (e.g., the at least one processor 1535, the at least one memory 1525, or both), may be included in a chip or chip assembly that is installed in the device 1505. In some examples, the transceiver 1510 may be operable to support communications via one or more communications links (e.g., a communication link 125, a backhaul communication link 120, a midhaul communication link 162, a fronthaul communication link 168).

The at least one memory 1525 may include RAM, ROM, or any combination thereof. The at least one memory 1525 may store computer-readable, computer-executable code 1530 including instructions that, when executed by one or more of the at least one processor 1535, cause the device 1505 to perform various functions described herein. The code 1530 may be stored in a non-transitory computer-readable medium such as system memory or another type of memory. In some cases, the code 1530 may not be directly executable by a processor of the at least one processor 1535 but may cause a computer (e.g., when compiled and executed) to perform functions described herein. In some cases, the at least one memory 1525 may contain, among other things, a BIOS which may control basic hardware or software operation such as the interaction with peripheral components or devices. In some examples, the at least one processor 1535 may include multiple processors and the at least one memory 1525 may include multiple memories. One or more of the multiple processors may be coupled with one or more of the multiple memories which may, individually or collectively, be configured to perform various functions herein (for example, as part of a processing system).

The at least one processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1535 may be configured to operate a memory array using a memory controller. In some other cases, a memory controller may be integrated into one or more of the at least one processor 1535. The at least one processor 1535 may be configured to execute computer-readable instructions stored in a memory (e.g., one or more of the at least one memory 1525) to cause the device 1505 to perform various functions (e.g., functions or tasks supporting HARQ design). For example, the device 1505 or a component of the device 1505 may include at least one processor 1535 and at least one memory 1525 coupled with one or more of the at least one processor 1535, the at least one processor 1535 and the at least one memory 1525 configured to perform various functions described herein. The at least one processor 1535 may be an example of a cloud-computing platform (e.g., one or more physical nodes and supporting software such as operating systems, virtual machines, or container instances) that may host the functions (e.g., by executing code 1530) to perform the functions of the device 1505. The at least one processor 1535 may be any one or more suitable processors capable of executing scripts or instructions of one or more software programs stored in the device 1505 (such as within one or more of the at least one memory 1525). In some examples, the at least one processor 1535 may include multiple processors and the at least one memory 1525 may include multiple memories. One or more of the multiple processors may be coupled with one or more of the multiple memories, which may, individually or collectively, be configured to perform various functions herein. In some examples, the at least one processor 1535 may be a component of a processing system, which may refer to a system (such as a series) of machines, circuitry (including, for example, one or both of processor circuitry (which may include the at least one processor 1535) and memory circuitry (which may include the at least one memory 1525)), or components, that receives or obtains inputs and processes the inputs to produce, generate, or obtain a set of outputs. The processing system may be configured to perform one or more of the functions described herein. For example, the at least one processor 1535 or a processing system including the at least one processor 1535 may be configured to, configurable to, or operable to cause the device 1505 to perform one or more of the functions described herein. Further, as described herein, being "configured to," being "configurable to," and being "operable to" may be used interchangeably and may be associated with a capability, when executing code stored in the at least one memory 1525 or otherwise, to perform one or more of the functions described herein.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the at least one memory 1525, the code 1530, and the at least one processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communication in accordance with examples as disclosed herein. For example, the communications manager 1520 is capable of, configured to, or operable to support a means for outputting, to a UE, a first transport block. The communications manager 1520 is capable of, configured to, or operable to support a means for obtaining, from the UE based on outputting the first transport block, one or more feedback messages that indicate that a reception of at least a portion of the first transport block was unsuccessful and indicate a request for a time delay associated with a retransmission of the first transport block. The communications manager 1520 is capable of, configured to, or operable to support a means for outputting, to the UE based on obtaining the one or more feedback messages, the retransmission of the first transport block.

Additionally, or alternatively, the communications manager 1520 may support wireless communication in accordance with examples as disclosed herein. For example, the communications manager 1520 is capable of, configured to, or operable to support a means for outputting, to a UE, a first transport block. The communications manager 1520 is capable of, configured to, or operable to support a means for obtaining, from the UE based on outputting the first transport block, one or more feedback messages that indicate that a reception of at least a portion of the first transport block was unsuccessful and indicate a request for a delayed scheduling of a retransmission of the first transport block. The communications manager 1520 is capable of, configured to, or operable to support a means for outputting, to the UE based on obtaining the one or more feedback messages, the retransmission of the first transport block.

By including or configuring the communications manager 1520 in accordance with examples as described herein, the device 1505 may support techniques for improved communication reliability, reduced latency, more efficient utilization of communication resources, and improved coordination between devices.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, one or more of the at least one processor 1535, one or more of the at least one memory 1525, the code 1530, or any combination thereof (for example, by a processing system including at least a portion of the at least one processor 1535, the at least one memory 1525, the code 1530, or any combination thereof). For example, the code 1530 may include instructions executable by one or more of the at least one processor 1535 to cause the device 1505 to perform various aspects of HARQ design as described herein, or the at least one processor 1535 and the at least one memory 1525 may be otherwise configured to, individually or collectively, perform or support such operations.

Figure 16:
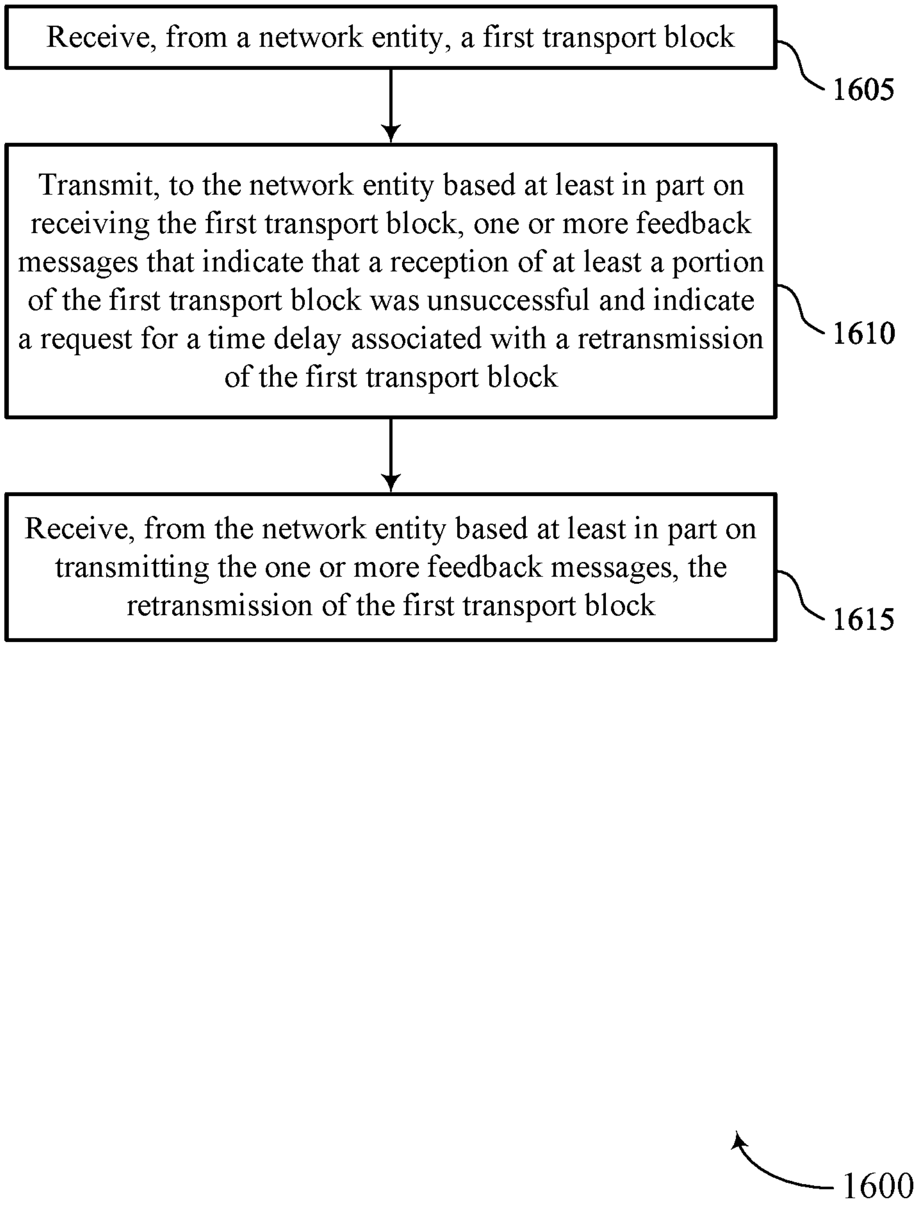
FIGS. 16 through 19 show flowcharts illustrating methods that support HARQ design in accordance with one or more aspects of the present disclosure.

FIG. 16 shows a flowchart illustrating a method 1600 that supports HARQ design in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving, from a network entity, a first transport block. The operations of block 1605 may be performed in accordance with examples as disclosed herein. In some examples, aspects of the operations of 1605 may be performed by a transport block manager 1025 as described with reference to FIG. 10.

At 1610, the method may include transmitting, to the network entity based on receiving the first transport block, one or more feedback messages that indicate that a reception of at least a portion of the first transport block was unsuccessful and indicate a request for a time delay associated with a retransmission of the first transport block. The operations of block 1610 may be performed in accordance with examples as disclosed herein. In some examples, aspects of the operations of 1610 may be performed by a feedback manager 1030 as described with reference to FIG. 10.

At 1615, the method may include receiving, from the network entity based on transmitting the one or more feedback messages, the retransmission of the first transport block. The operations of block 1615 may be performed in accordance with examples as disclosed herein. In some examples, aspects of the operations of 1615 may be performed by a retransmission manager 1035 as described with reference to FIG. 10.

Figure 17:
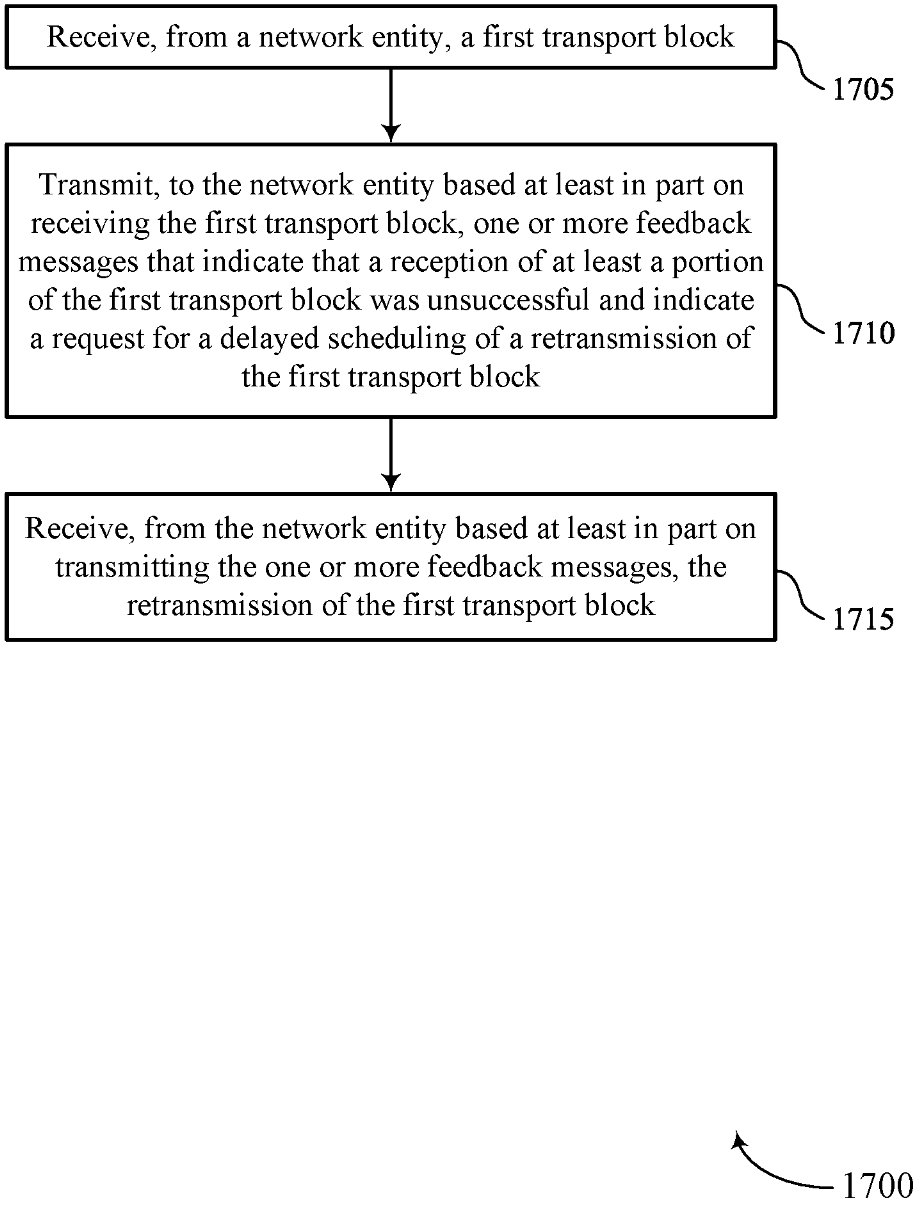

FIG. 17 shows a flowchart illustrating a method 1700 that supports HARQ design in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving, from a network entity, a first transport block. The operations of block 1705 may be performed in accordance with examples as disclosed herein. In some examples, aspects of the operations of 1705 may be performed by a transport block manager 1025 as described with reference to FIG. 10.

At 1710, the method may include transmitting, to the network entity based on receiving the first transport block, one or more feedback messages that indicate that a reception of at least a portion of the first transport block was unsuccessful and indicate a request for a delayed scheduling of a retransmission of the first transport block. The operations of block 1710 may be performed in accordance with examples as disclosed herein. In some examples, aspects of the operations of 1710 may be performed by a feedback manager 1030 as described with reference to FIG. 10.

At 1715, the method may include receive, from the network entity based on transmitting the one or more feedback messages, the retransmission of the first transport block. The operations of block 1715 may be performed in accordance with examples as disclosed herein. In some examples, aspects of the operations of 1715 may be performed by a retransmission manager 1035 as described with reference to FIG. 10.

Figure 18:
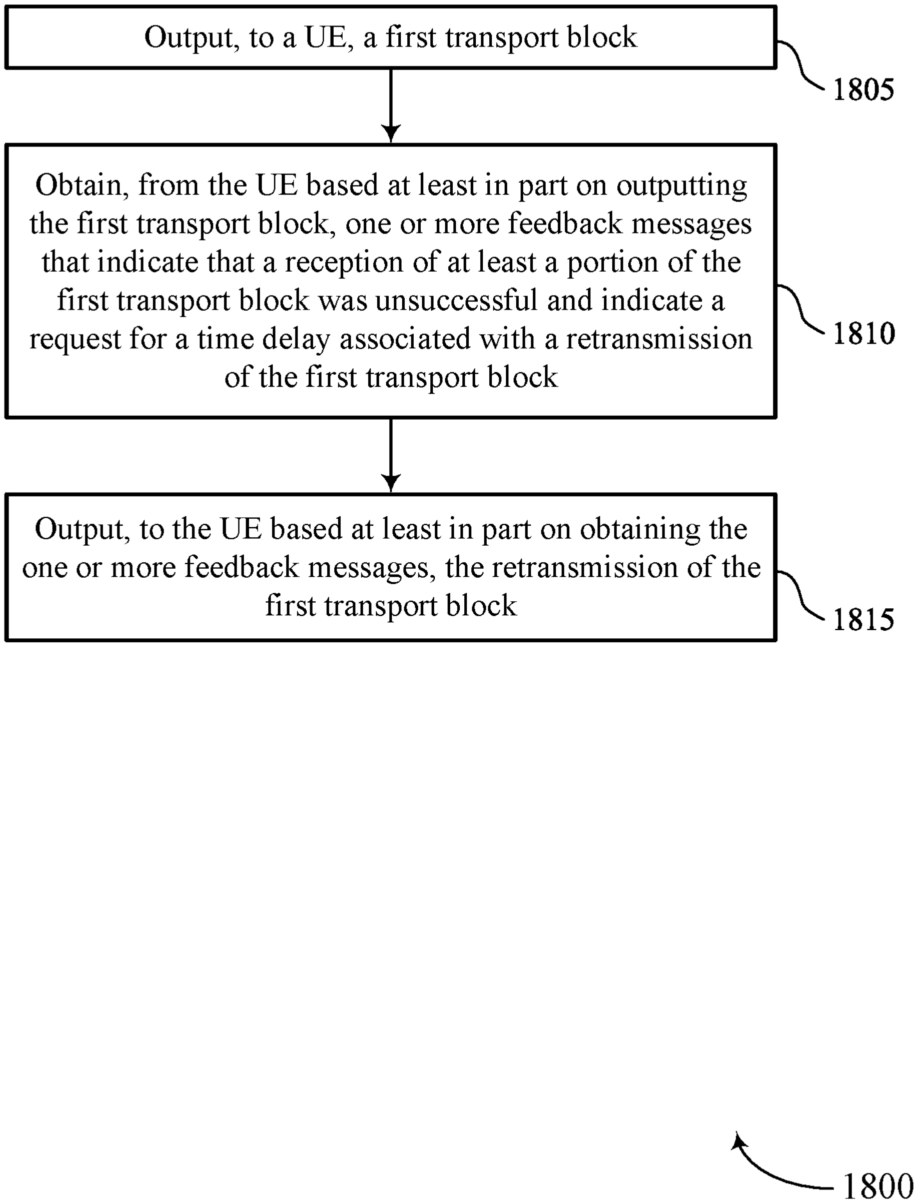

FIG. 18 shows a flowchart illustrating a method 1800 that supports HARQ design in accordance with one or more aspects of the present disclosure. The operations of the method 1800 may be implemented by a network entity or its components as described herein. For example, the operations of the method 1800 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1805, the method may include outputting, to a UE, a first transport block. The operations of block 1805 may be performed in accordance with examples as disclosed herein. In some examples, aspects of the operations of 1805 may be performed by a transport block manager 1425 as described with reference to FIG. 14.

At 1810, the method may include obtaining, from the UE based on outputting the first transport block, one or more feedback messages that indicate that a reception of at least a portion of the first transport block was unsuccessful and indicate a request for a time delay associated with a retransmission of the first transport block. The operations of block 1810 may be performed in accordance with examples as disclosed herein. In some examples, aspects of the operations of 1810 may be performed by a feedback manager 1430 as described with reference to FIG. 14.

At 1815, the method may include outputting, to the UE based on obtaining the one or more feedback messages, the retransmission of the first transport block. The operations of block 1815 may be performed in accordance with examples as disclosed herein. In some examples, aspects of the operations of 1815 may be performed by a retransmission manager 1435 as described with reference to FIG. 14.

Figure 19:
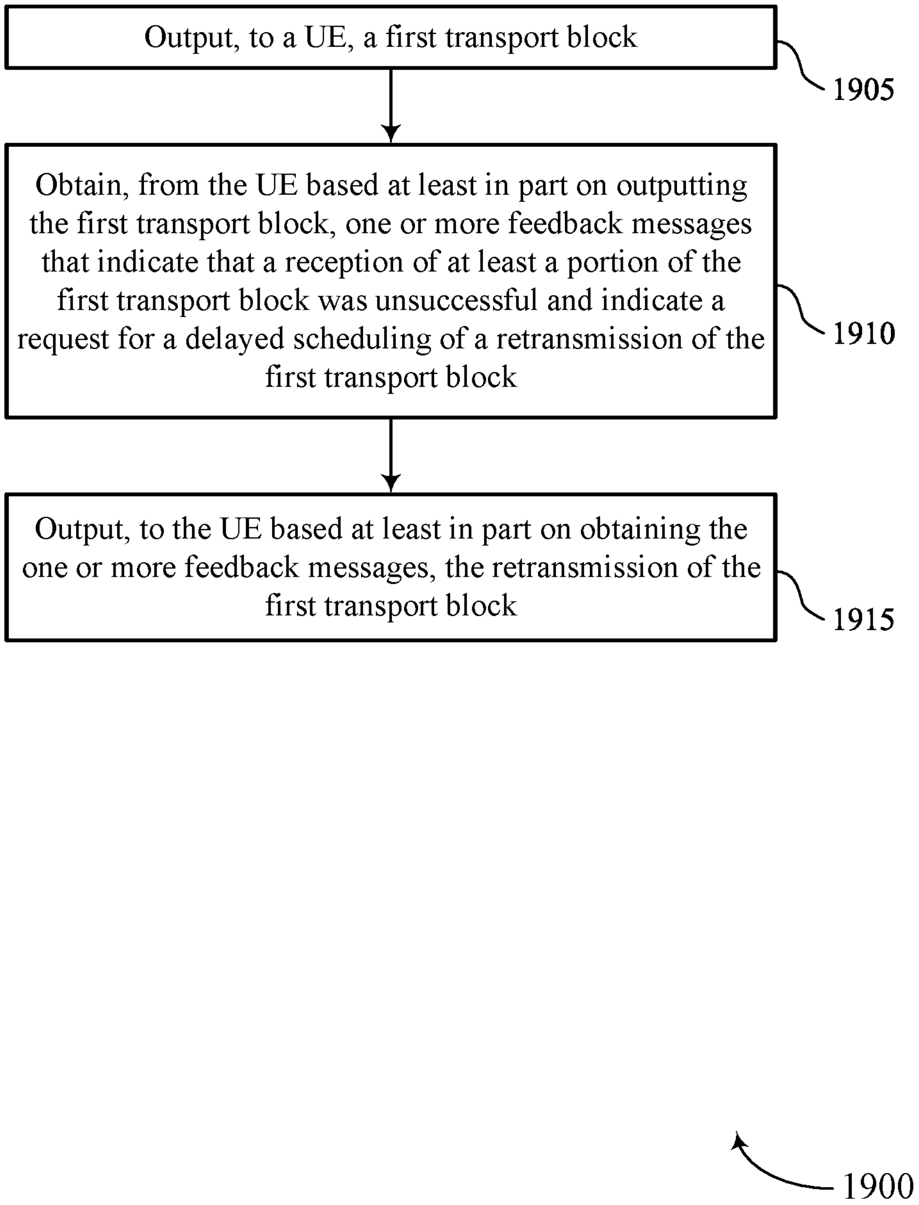

FIG. 19 shows a flowchart illustrating a method 1900 that supports HARQ design in accordance with one or more aspects of the present disclosure. The operations of the method 1900 may be implemented by a network entity or its components as described herein. For example, the operations of the method 1900 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1905, the method may include outputting, to a UE, a first transport block. The operations of block 1905 may be performed in accordance with examples as disclosed herein. In some examples, aspects of the operations of 1905 may be performed by a transport block manager 1425 as described with reference to FIG. 14.

At 1910, the method may include obtaining, from the UE based on outputting the first transport block, one or more feedback messages that indicate that a reception of at least a portion of the first transport block was unsuccessful and indicate a request for a delayed scheduling of a retransmission of the first transport block. The operations of block 1910 may be performed in accordance with examples as disclosed herein. In some examples, aspects of the operations of 1910 may be performed by a feedback manager 1430 as described with reference to FIG. 14.

At 1915, the method may include outputting, to the UE based on obtaining the one or more feedback messages, the retransmission of the first transport block. The operations of block 1915 may be performed in accordance with examples as disclosed herein. In some examples, aspects of the operations of 1915 may be performed by a retransmission manager 1435 as described with reference to FIG. 14.

The following provides an overview of aspects of the present disclosure:

Aspect 1: A method for wireless communication by a UE, comprising: receiving, from a network entity, a first transport block; transmitting, to the network entity based at least in part on receiving the first transport block, one or more feedback messages that indicate that a reception of at least a portion of the first transport block was unsuccessful and indicate a request for a time delay associated with a retransmission of the first transport block; and receiving, from the network entity based at least in part on transmitting the one or more feedback messages, the retransmission of the first transport block.

Aspect 2: The method of aspect 1, wherein the time delay comprises a delayed timeline for a transmission of a first acknowledgment feedback or a first negative acknowledgment feedback associated with a reception of the retransmission of the first transport block.

Aspect 3: The method of aspect 2, further comprising: receiving, from the network entity after transmitting the one or more feedback messages, a second transport block; and transmitting, to the network entity based at least in part on receiving the second transport block, a second acknowledgment feedback or a second negative acknowledgment feedback associated with a reception of the second transport block, wherein the transmission of the second acknowledgment feedback or the second negative acknowledgment feedback occurs prior to the transmission of the first acknowledgment feedback or the first negative acknowledgment feedback.

Aspect 4: The method of any of aspect 1, wherein the time delay comprises an extended transmission duration for the retransmission of the first transport block.

Aspect 5: The method of aspect 4, wherein receiving the retransmission of the first transport block further comprising: receiving, from the network entity based at least in part on transmitting the one or more feedback messages, a second transport block, wherein the retransmission of the first transport block is frequency-division multiplexed with the second transport block.

Aspect 6: The method of any of aspects 1 through 5, further comprising: receiving, from the network entity, a second transport block on a second component carrier, wherein the first transport block is received on a first component carrier.

Aspect 7: The method of aspect 6, wherein transmitting the one or more feedback messages, further comprises: transmitting, to the network entity based at least in part on receiving the first transport block and the second transport block, one or more joint feedback messages associated with both the first transport block and the second transport block, wherein the one or more joint feedback messages indicate that the reception of at least the portion of the first transport block was unsuccessful and that a reception of at least the portion of the second transport block was unsuccessful and indicate the request for the time delay.

Aspect 8: The method of any of aspects 6 through 7, further comprising: receiving, from the network entity based at least in part on a reception of at least a portion of the second transport block was unsuccessful, a retransmission of the second transport block, wherein the retransmission of the second transport block is received after the retransmission of the first transport block.

Aspect 9: The method of any of aspects 1 through 8, wherein transmitting the one or more feedback messages further comprises: transmitting a negative acknowledgment feedback message that indicates that the reception of at least the portion of the first transport block was unsuccessful; and transmitting a message that indicates the request for the time delay associated with the retransmission of the first transport block.

Aspect 10: The method of any of aspects 1 through 9, wherein transmitting the one or more feedback messages further comprises: transmitting a negative acknowledgment feedback message that indicates that the reception of at least the portion of the first transport block was unsuccessful and that indicates the request for the time delay associated with the retransmission of the first transport block.

Aspect 11: A method for wireless communication by a UE, comprising: receiving, from a network entity, a first transport block; transmitting, to the network entity based at least in part on receiving the first transport block, one or more feedback messages that indicate that a reception of at least a portion of the first transport block was unsuccessful and indicate a request for a delayed scheduling of a retransmission of the first transport block; and receive, from the network entity based at least in part on transmitting the one or more feedback messages, the retransmission of the first transport block.

Aspect 12: The method of aspect 11, further comprising: receiving, from the network entity, a second transport block on a second component carrier, wherein the first transport block is received on a first component carrier.

Aspect 13: The method of aspect 12, wherein transmitting the one or more feedback messages, further comprises: transmitting, to the network entity based at least in part on receiving the first transport block and receiving the second transport block, one or more joint feedback messages associated with both the first transport block and the second transport block, wherein the one or more joint feedback messages indicate that the reception of at least the portion of the first transport block and indicate that a reception of at least the portion of the second transport block was unsuccessful and indicate the request for the delayed scheduling.

Aspect 14: The method of any of aspects 11 through 13, wherein transmitting the one or more feedback messages further comprises: transmitting a negative acknowledgment feedback message that indicates that the reception of at least the portion of the first transport block was unsuccessful; and transmitting a request message that indicates the request for the delayed scheduling.

Aspect 15: The method of any of aspects 11 through 14, wherein transmitting the one or more feedback messages further comprises: transmitting a negative acknowledgment feedback message that indicates that the reception of at least the portion of the first transport block was unsuccessful and that indicates the request for the delayed scheduling.

Aspect 16: A method for wireless communication by a network entity, comprising: outputting, to a UE, a first transport block; obtaining, from the UE based at least in part on outputting the first transport block, one or more feedback messages that indicate that a reception of at least a portion of the first transport block was unsuccessful and indicate a request for a time delay associated with a retransmission of the first transport block; and outputting, to the UE based at least in part on obtaining the one or more feedback messages, the retransmission of the first transport block.

Aspect 17: The method of aspect 16, wherein the time delay comprises a delayed timeline for obtaining a first acknowledgment feedback or a first negative acknowledgment feedback associated with the retransmission of the first transport block.

Aspect 18: The method of aspect 17, further comprising: outputting, to the UE based at least in part on obtaining the one or more feedback messages, a second transport block; and obtaining, from the UE based at least in part on outputting the second transport block, a second acknowledgment feedback or a second negative acknowledgment feedback associated with the second transport block, wherein the obtaining of the second acknowledgment feedback or the second negative acknowledgment feedback occurs prior to the obtaining of the first acknowledgment feedback or the first negative acknowledgment feedback.

Aspect 19: The method of aspect 16, wherein the time delay comprises an extended transmission duration for the retransmission of the first transport block.

Aspect 20: The method of aspect 19, further comprising: outputting, to the UE based at least in part on obtaining the one or more feedback messages, a second transport block and the retransmission of the first transport block, wherein the retransmission of the first transport block is frequency-division multiplexed with the second transport block.

Aspect 21: The method of any of aspects 16 through 20, further comprising: outputting, to the UE, a second transport block on a second component carrier, wherein the first transport block is outputted on a first component carrier.

Aspect 22: The method of aspect 21, wherein obtaining the one or more feedback messages, further comprises: obtaining, from the UE based at least in part on outputting the first transport block and outputting the second transport block, one or more joint feedback messages associated with both the first transport block and the second transport block, wherein the one or more joint feedback messages indicate that the reception of at least the portion of the first transport block and a reception of at least the portion of the second transport block was unsuccessful and indicate the request for the time delay.

Aspect 23: The method of any of aspects 21 through 22, further comprising: obtaining, from the UE based at least in part on outputting the first transport block and outputting the second transport block, one or more second feedback messages associated with the second transport block, wherein the one or more second feedback messages indicate that a reception of at least the portion of the second transport block was unsuccessful; and outputting, to the UE based at least in part on the reception of the one or more second feedback messages, a retransmission of the second transport block, wherein the retransmission of the second transport block is outputted after the retransmission of the first transport block.

Aspect 24: The method of any of aspects 16 through 23, wherein obtaining the one or more feedback messages further comprises: obtaining a negative acknowledgment feedback message that indicates that the reception of at least the portion of the first transport block was unsuccessful; and obtaining a request message that indicates the request for the time delay associated with the retransmission of the first transport block.

Aspect 25: The method of any of aspects 16 through 24, wherein obtaining the one or more feedback messages further comprises: obtaining a negative acknowledgment feedback message that indicates that the reception of at least the portion of the first transport block was unsuccessful and that indicates the request for the time delay associated with the retransmission of the first transport block.

Aspect 26: A method for wireless communication by a network entity, comprising: outputting, to a UE, a first transport block; obtaining, from the UE based at least in part on outputting the first transport block, one or more feedback messages that indicate that a reception of at least a portion of the first transport block was unsuccessful and indicate a request for a delayed scheduling of a retransmission of the first transport block; and outputting, to the UE based at least in part on obtaining the one or more feedback messages, the retransmission of the first transport block.

Aspect 27: The method of aspect 26, further comprising: outputting, to the UE, a second transport block on a second component carrier, wherein the first transport block is outputted on a first component carrier.

Aspect 28: The method of aspect 27, wherein obtaining the one or more feedback messages, further comprises: obtaining, from the UE based at least in part on outputting the first transport block and outputting the second transport block, one or more joint feedback messages associated with both the first transport block and the second transport block, wherein the one or more joint feedback messages indicate that the reception of at least the portion of the first transport block and a reception of at least the portion of the second transport block was unsuccessful and indicate the request for the delayed scheduling.

Aspect 29: The method of any of aspects 26 through 28, wherein obtaining the one or more feedback messages further comprises: obtaining a negative acknowledgment feedback message that indicates that the reception of at least the portion of the first transport block was unsuccessful; and obtaining a request message that indicates the request for the delayed scheduling.

Aspect 30: The method of any of aspects 26 through 29, wherein obtaining the one or more feedback messages further comprises: obtaining a negative acknowledgment feedback message that indicates that the reception of at least the portion of the first transport block was unsuccessful and that indicates the request for the delayed scheduling.

Aspect 31: A user equipment (UE) for wireless communication, comprising one or more memories storing processor-executable code, and one or more processors coupled with the one or more memories and individually or collectively operable to execute the code to cause the user equipment (UE) to perform a method of any of aspects 1 through 10.

Aspect 32: A user equipment (UE) for wireless communication, comprising at least one means for performing a method of any of aspects 1 through 10.

Aspect 33: A non-transitory computer-readable medium storing code for wireless communication, the code comprising instructions executable by one or more processors to perform a method of any of aspects 1 through 10.

Aspect 34: A user equipment (UE) for wireless communication, comprising one or more memories storing processor-executable code, and one or more processors coupled with the one or more memories and individually or collectively operable to execute the code to cause the user equipment (UE) to perform a method of any of aspects 11 through 15.

Aspect 35: A user equipment (UE) for wireless communication, comprising at least one means for performing a method of any of aspects 11 through 15.

Aspect 36: A non-transitory computer-readable medium storing code for wireless communication, the code comprising instructions executable by one or more processors to perform a method of any of aspects 11 through 15.

Aspect 37: A network entity for wireless communication, comprising one or more memories storing processor-executable code, and one or more processors coupled with the one or more memories and individually or collectively operable to execute the code to cause the network entity to perform a method of any of aspects 16 through 25.

Aspect 38: A network entity for wireless communication, comprising at least one means for performing a method of any of aspects 16 through 25.

Aspect 39: A non-transitory computer-readable medium storing code for wireless communication, the code comprising instructions executable by one or more processors to perform a method of any of aspects 16 through 25.

Aspect 40: A network entity for wireless communication, comprising one or more memories storing processor-executable code, and one or more processors coupled with the one or more memories and individually or collectively operable to execute the code to cause the network entity to perform a method of any of aspects 26 through 30.

Aspect 41: A network entity for wireless communication, comprising at least one means for performing a method of any of aspects 26 through 30.

Aspect 42: A non-transitory computer-readable medium storing code for wireless communication, the code comprising instructions executable by one or more processors to perform a method of any of aspects 26 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory)

and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the user equipment (UE) to:

receive, from a network entity, a first transport block;

transmit, to the network entity based at least in part on receiving the first transport block, one or more feedback messages that indicate that a reception of at least a portion of the first transport block was unsuccessful and indicate a request for a time delay associated with a retransmission of the first transport block; and receive, from the network entity based at least in part on transmitting the one or more feedback messages, the retransmission of the first transport block.

2. The UE of claim 1, wherein the time delay comprises a delayed timeline for a transmission of a first acknowledgment feedback or a first negative acknowledgment feedback associated with a reception of the retransmission of the first transport block.

3. The UE of claim 2, wherein the one or more processors are individually or collectively further operable to execute the code to cause the UE to:

receive, from the network entity after transmitting the one or more feedback messages, a second transport block; and transmit, to the network entity based at least in part on receiving the second transport block, a second acknowledgment feedback or a second negative acknowledgment feedback associated with a reception of the second transport block, wherein the transmission of the second acknowledgment feedback or the second negative acknowledgment feedback occurs prior to the transmission of the first acknowledgment feedback or the first negative acknowledgment feedback.

4. The UE of claim 1, wherein the time delay comprises an extended transmission duration for the retransmission of the first transport block.

5. The UE of claim 4, wherein the one or more processors are individually or collectively further operable to execute the code to cause the UE to:

receive, from the network entity based at least in part on transmitting the one or more feedback messages, a second transport block, wherein the retransmission of the first transport block is frequency-division multiplexed with the second transport block.

6. The UE of claim 1, wherein the one or more processors are individually or collectively further operable to execute the code to cause the UE to:

receive, from the network entity, a second transport block on a second component carrier, wherein the first transport block is received on a first component carrier.

7. The UE of claim 6, wherein, to transmit the one or more feedback messages, the one or more processors are individually or collectively further operable to execute the code to cause the UE to:

transmit, to the network entity based at least in part on receiving the first transport block and the second transport block, one or more joint feedback messages associated with both the first transport block and the second transport block, wherein the one or more joint feedback messages indicate that the reception of at least the portion of the first transport block was unsuccessful and that a reception of at least the portion of the second transport block was unsuccessful and indicate the request for the time delay.

8. The UE of claim 6, wherein the one or more processors are individually or collectively further operable to execute the code to cause the UE to:

receive, from the network entity based at least in part on a reception of at least a portion of the second transport block was unsuccessful, a retransmission of the second transport block, wherein the retransmission of the second transport block is received after the retransmission of the first transport block.

9. The UE of claim 1, wherein, to transmit the one or more feedback messages, the one or more processors are individually or collectively further operable to execute the code to cause the UE to:

transmit a negative acknowledgment feedback message that indicates that the reception of at least the portion of the first transport block was unsuccessful; and transmit a message that indicates the request for the time delay associated with the retransmission of the first transport block.

10. The UE of claim 1, wherein, to transmit the one or more feedback messages, the one or more processors are individually or collectively further operable to execute the code to cause the UE to:

transmit a negative acknowledgment feedback message that indicates that the reception of at least the portion of the first transport block was unsuccessful and that indicates the request for the time delay associated with the retransmission of the first transport block.

11. A user equipment (UE), comprising:
one or more memories storing processor-executable code; and
one or more processors coupled with the one or more memories and individually or collectively operable to execute the code to cause the UE to:
receive, from a network entity, a first transport block;
transmit, to the network entity based at least in part on receiving the first transport block, one or more feedback messages that indicate that a reception of at least a portion of the first transport block was unsuccessful and indicate a request for a delayed scheduling of a retransmission of the first transport block; and
receive, from the network entity based at least in part on transmitting the one or more feedback messages, the retransmission of the first transport block.

12. The UE of claim 11, wherein the one or more processors are individually or collectively further operable to execute the code to cause the UE to:
receive, from the network entity, a second transport block on a second component carrier, wherein the first transport block is received on a first component carrier.

13. The UE of claim 12, wherein, to transmit the one or more feedback messages, the one or more processors are individually or collectively further operable to execute the code to cause the UE to:
transmit, to the network entity based at least in part on receiving the first transport block and receiving the second transport block, one or more joint feedback messages associated with both the first transport block and the second transport block, wherein the one or more joint feedback messages indicate that the reception of at least the portion of the first transport block and indicate that a reception of at least the portion of the second transport block was unsuccessful and indicate the request for the delayed scheduling.

14. The UE of claim 11, wherein, to transmit the one or more feedback messages, the one or more processors are individually or collectively further operable to execute the code to cause the UE to:
transmit a negative acknowledgment feedback message that indicates that the reception of at least the portion of the first transport block was unsuccessful; and
transmit a request message that indicates the request for the delayed scheduling.

15. The UE of claim 11, wherein, to transmit the one or more feedback messages, the one or more processors are individually or collectively further operable to execute the code to cause the UE to:
transmit a negative acknowledgment feedback message that indicates that the reception of at least the portion of the first transport block was unsuccessful and that indicates the request for the delayed scheduling.

16. A network entity, comprising:
one or more memories storing processor-executable code; and
one or more processors coupled with the one or more memories and individually or collectively operable to execute the code to cause the network entity to:
output, to a user equipment (UE), a first transport block;
obtain, from the UE based at least in part on outputting the first transport block, one or more feedback messages that indicate that a reception of at least a portion of the first transport block was unsuccessful and indicate a request for a time delay associated with a retransmission of the first transport block; and
output, to the UE based at least in part on obtaining the one or more feedback messages, the retransmission of the first transport block.

17. The network entity of claim 16, wherein the time delay comprises a delayed timeline for obtaining a first acknowledgment feedback or a first negative acknowledgment feedback associated with the retransmission of the first transport block.

18. The network entity of claim 17, wherein the one or more processors are individually or collectively further operable to execute the code to cause the network entity to:
output, to the UE based at least in part on obtaining the one or more feedback messages, a second transport block; and
obtain, from the UE based at least in part on outputting the second transport block, a second acknowledgment feedback or a second negative acknowledgment feedback associated with the second transport block, wherein the obtaining of the second acknowledgment feedback or the second negative acknowledgment feedback occurs prior to the obtaining of the first acknowledgment feedback or the first negative acknowledgment feedback.

19. The network entity of claim 16, wherein the time delay comprises an extended transmission duration for the retransmission of the first transport block.

20. The network entity of claim 19, wherein the one or more processors are individually or collectively further operable to execute the code to cause the network entity to:
output, to the UE based at least in part on obtaining the one or more feedback messages, a second transport block and the retransmission of the first transport block, wherein the retransmission of the first transport block is frequency-division multiplexed with the second transport block.

21. The network entity of claim 16, wherein the one or more processors are individually or collectively further operable to execute the code to cause the network entity to:
output, to the UE, a second transport block on a second component carrier, wherein the first transport block is outputted on a first component carrier.

22. The network entity of claim 21, wherein, to obtain the one or more feedback messages, the one or more processors are individually or collectively further operable to execute the code to cause the network entity to:
obtain, from the UE based at least in part on outputting the first transport block and outputting the second transport block, one or more joint feedback messages associated with both the first transport block and the second transport block, wherein the one or more joint feedback messages indicate that the reception of at least the portion of the first transport block and a reception of at least the portion of the second transport block was unsuccessful and indicate the request for the time delay.

23. The network entity of claim 21, wherein the one or more processors are individually or collectively further operable to execute the code to cause the network entity to:
obtain, from the UE based at least in part on outputting the first transport block and outputting the second transport block, one or more second feedback messages associated with the second transport block, wherein the one or more second feedback messages indicate that a reception of at least the portion of the second transport block was unsuccessful; and output, to the UE based at least in part on the reception of the one or more second feedback messages, a retransmission of the second transport block, wherein the retransmission of the second transport block is outputted after the retransmission of the first transport block.

24. The network entity of claim 16, wherein, to obtain the one or more feedback messages, the one or more processors are individually or collectively further operable to execute the code to cause the network entity to:

obtain a negative acknowledgment feedback message that indicates that the reception of at least the portion of the first transport block was unsuccessful; and obtain a request message that indicates the request for the time delay associated with the retransmission of the first transport block.

25. The network entity of claim 16, wherein, to obtain the one or more feedback messages, the one or more processors are individually or collectively further operable to execute the code to cause the network entity to:

obtain a negative acknowledgment feedback message that indicates that the reception of at least the portion of the first transport block was unsuccessful and that indicates the request for the time delay associated with the retransmission of the first transport block.

26. A network entity, comprising:

one or more memories storing processor-executable code; and one or more processors coupled with the one or more memories and individually or collectively operable to execute the code to cause the network entity to:

output, to a user equipment (UE), a first transport block;

obtain, from the UE based at least in part on outputting the first transport block, one or more feedback messages that indicate that a reception of at least a portion of the first transport block was unsuccessful and indicate a request for a delayed scheduling of a retransmission of the first transport block; and output, to the UE based at least in part on obtaining the one or more feedback messages, the retransmission of the first transport block.

27. The network entity of claim 26, wherein the one or more processors are individually or collectively further operable to execute the code to cause the network entity to:

output, to the UE, a second transport block on a second component carrier, wherein the first transport block is outputted on a first component carrier.

28. The network entity of claim 27, wherein, to obtain the one or more feedback messages, the one or more processors are individually or collectively further operable to execute the code to cause the network entity to:

obtain, from the UE based at least in part on outputting the first transport block and outputting the second transport block, one or more joint feedback messages associated with both the first transport block and the second transport block, wherein the one or more joint feedback messages indicate that the reception of at least the portion of the first transport block and a reception of at least the portion of the second transport block was unsuccessful and indicate the request for the delayed scheduling.

29. The network entity of claim 26, wherein, to obtain the one or more feedback messages, the one or more processors are individually or collectively further operable to execute the code to cause the network entity to:

obtain a negative acknowledgment feedback message that indicates that the reception of at least the portion of the first transport block was unsuccessful; and obtain a request message that indicates the request for the delayed scheduling.

30. The network entity of claim 26, wherein, to obtain the one or more feedback messages, the one or more processors are individually or collectively further operable to execute the code to cause the network entity to:

obtain a negative acknowledgment feedback message that indicates that the reception of at least the portion of the first transport block was unsuccessful and that indicates the request for the delayed scheduling.

* * * * *